(12) United States Patent
Rome et al.

(10) Patent No.: US 7,931,178 B2
(45) Date of Patent: *Apr. 26, 2011

(54) SUSPENDED LOAD ERGONOMIC BACKPACK

(75) Inventors: Lawrence C Rome, Strafford, PA (US); Andy L Ruina, Ithaca, NY (US)

(73) Assignee: Lighting Packs, LLC, Straford, PA (US)

( * ) Notice: Subject to any disclaimer, the term of this patent is extended or adjusted under 35 U.S.C. 154(b) by 294 days.

This patent is subject to a terminal disclaimer.

(21) Appl. No.: 11/957,222

(22) Filed: Dec. 14, 2007

(65) Prior Publication Data

US 2008/0185411 A1 Aug. 7, 2008

Related U.S. Application Data

(60) Continuation-in-part of application No. 11/056,849, filed on Feb. 11, 2005, now Pat. No. 7,391,123, which is a division of application No. 10/803,112, filed on Mar. 17, 2004, now Pat. No. 6,982,497.

(60) Provisional application No. 60/875,092, filed on Dec. 14, 2006, provisional application No. 60/875,238, filed on Dec. 14, 2006, provisional application No. 60/455,477, filed on Mar. 17, 2003.

(51) Int. Cl.
*A45F 3/08* (2006.01)

(52) U.S. Cl. ........ 224/634; 224/633; 224/637; 224/254; 224/262; 224/263; 254/390; 254/393; 206/315.3

(58) Field of Classification Search ................. 224/631, 224/634–636, 254, 263, 604; 212/272; 254/390–399, 900

See application file for complete search history.

(56) References Cited

U.S. PATENT DOCUMENTS 1,664,590 A * 4/1928 Cassal ............................. 396/21

(Continued)

FOREIGN PATENT DOCUMENTS

CA 2385481 11/2002

(Continued)

OTHER PUBLICATIONS

"Energy Scavenging with Shoe-Mounted Piezoelectrics Shoe Power; Two Approaches," IEEE Micro, Computer.org, http://www.computer.org/micro/homepage/may_june/shenck/01.htm, , Feb. 28, 2003, 17 pages.

(Continued)

*Primary Examiner* — Nathan J Newhouse
*Assistant Examiner* — John Cogill
(74) *Attorney, Agent, or Firm* — Woodcock Washburn LLP

(57) ABSTRACT

A suspended-load backpack designed to permit the load to move relative to the wearer during walking and running so that the large movements between the load and the wearer of the backpack reduce the fluctuations of vertical motion of the load with respect to ground. Because the hip (and thus the pack body) goes up a down a good deal during walking, a large relative movement between the wearer and the load reduces the absolute excursion of the load. This movement may be, in turn, transferred to a motor through, for example, a rack and pinion gear, to convert the mechanical movement to electrical or mechanical energy. Such movement of the suspended-load relative to the wearer also reduces the forces on the wearer's body while walking or running, thus reducing the likelihood of orthopedic injury. The suspended-load backpack includes a suspension system having a first portion connected to shoulder straps directly or through an interface and a second portion connected to the pack body and a compliant mechanism that permits the second portion of the suspension system and the pack body to move up and down relative to the first portion of the suspension system in accordance with a gait of the wearer of the backpack.

23 Claims, 18 Drawing Sheets

U.S. PATENT DOCUMENTS

| | | | | |
|---|---|---|---|---|
| 1,979,978 | A * | 11/1934 | Martin | 190/115 |
| 2,421,822 | A * | 6/1947 | Wood | 248/543 |
| 2,437,631 | A * | 3/1948 | Wood | 248/613 |
| 3,282,483 | A * | 11/1966 | Babcock | 224/262 |
| 3,600,855 | A * | 8/1971 | Starck et al. | 49/51 |
| 3,760,905 | A | 9/1973 | Dower | |
| 3,797,718 | A * | 3/1974 | Plant | 224/262 |
| 4,013,170 | A * | 3/1977 | Hutterer | 206/521 |
| 4,099,657 | A * | 7/1978 | Zufich | 224/262 |
| 4,154,381 | A * | 5/1979 | Zufich | 224/262 |
| 4,194,656 | A | 3/1980 | Zulfich | |
| 4,206,983 | A * | 6/1980 | Nettman et al. | 352/243 |
| 4,759,431 | A * | 7/1988 | King et al. | 190/18 A |
| 4,887,751 | A | 12/1989 | Lehman | |
| 4,921,202 | A * | 5/1990 | Miyake et al. | 248/581 |
| 4,949,425 | A * | 8/1990 | Dodson et al. | 16/198 |
| 5,136,173 | A | 8/1992 | Rynne | |
| 5,443,247 | A | 8/1995 | Polites et al. | |
| 5,474,278 | A * | 12/1995 | Cleveland | 254/334 |
| 5,503,314 | A | 4/1996 | Fiscus | |
| 5,552,695 | A | 9/1996 | Schwartz | |
| 5,564,612 | A | 10/1996 | Gregory | |
| 5,613,665 | A | 3/1997 | Lund | |
| 5,617,984 | A | 4/1997 | Fabel | |
| 5,628,443 | A | 5/1997 | Deutsch | |
| 5,696,413 | A | 12/1997 | Woodbridge et al. | |
| 5,762,243 | A | 6/1998 | McMaster et al. | |
| 5,769,431 | A | 6/1998 | Cordova | |
| 5,794,911 | A * | 8/1998 | Hill | 248/588 |
| 5,806,740 | A | 9/1998 | Carlson | |
| 5,818,132 | A | 10/1998 | Konotchick | |
| 5,890,640 | A | 4/1999 | Thompson | |
| 5,902,073 | A | 5/1999 | Eungard et al. | |
| 5,904,282 | A | 5/1999 | Gleason | |
| 5,984,157 | A | 11/1999 | Swetish | |
| 6,020,653 | A | 2/2000 | Woodbridge et al. | |
| 6,179,186 | B1 | 1/2001 | Blanking | |
| 6,360,534 | B1 | 3/2002 | Denniss | |
| 6,392,314 | B1 * | 5/2002 | Dick | 290/53 |
| 6,423,412 | B1 | 7/2002 | Zhang et al. | |
| 6,537,184 | B2 * | 3/2003 | Kim | 482/122 |
| 6,545,384 | B1 | 4/2003 | Pelrine et al. | |
| 6,607,107 | B2 | 8/2003 | Dexheimer | |
| 6,619,523 | B1 | 9/2003 | Duckworth | |
| 6,622,483 | B2 | 9/2003 | Denniss | |
| 6,626,342 | B1 | 9/2003 | Gleason | |
| 6,802,442 | B1 | 10/2004 | Thompson | |
| 6,876,135 | B2 | 4/2005 | Pelrine et al. | |
| 6,982,497 | B2 | 1/2006 | Rome | |
| 7,131,534 | B2 | 11/2006 | Enes | |
| 7,345,407 | B2 * | 3/2008 | Tanner | 310/339 |
| 7,361,999 | B2 * | 4/2008 | Yeh | 290/1 R |
| 7,498,682 | B2 * | 3/2009 | Lemieux | 290/1 R |
| 7,559,443 | B2 * | 7/2009 | Pratt et al. | 224/201 |
| 2001/0035723 | A1 | 11/2001 | Pelrine et al. | |
| 2002/0074373 | A1* | 6/2002 | Heinz et al. | 224/637 |
| 2002/0171213 | A1 | 11/2002 | Kim | |
| 2003/0062723 | A1 | 4/2003 | Mancl et al. | |
| 2004/0016781 | A1* | 1/2004 | Smith | 224/184 |
| 2004/0262354 | A1* | 12/2004 | Meyer | 224/628 |
| 2006/0011689 | A1 | 1/2006 | Reid | |
| 2006/0046907 | A1 | 3/2006 | Rastegar et al. | |
| 2006/0192386 | A1 | 8/2006 | Rome | |
| 2008/0197163 | A1* | 8/2008 | Yip | 224/635 |

FOREIGN PATENT DOCUMENTS

| | | |
|---|---|---|
| CA | 2385481 A1 * | 11/2002 |
| CN | 200983943 Y * | 12/2007 |
| DE | 296 15 526 U1 | 10/1996 |
| DE | 29615526 U1 | 10/1996 |
| JP | 2004364486 A * | 12/2004 |
| WO | WO 00/19862 | 4/2000 |
| WO | WO 2007/016781 A1 | 2/2007 |

OTHER PUBLICATIONS

"Pedaling onto the Information Superhighway" http://cnn.technologyprintthis.clickability.com, Feb. 18, 2003, 2 pages.

Alexander et al., "Energy-Saving Mechanisms in Walking and Running," Journal of Experimental Biology, 1991, vol. 160, pp. 55-69.

Alexander et al., "The Role of Tendon Elasticity in the Locomotion of the Camel," Journal of Zoology, Apr. 13, 1982, vol. 198, pp. 293-313.

Balague et al., "Non-Specific Low Back Pain in Children and Adolescents: Risk Factors," European Spine Journal, 1999, vol. 8, No. 6, pp. 429-438, one page.

Biewener et al., "In Vivo Muscle Force-Length Behavior During Steady-Speed Hopping in Tammar Wallabies," Journal of Experimental Biology, May 12, 1998, vol. 201(pt11), pp. 1681-1694.

Biewener et al., "Muscle and Tendon Contributions to Force, Work, and Elastic Energy Savings: A Comparative Perspective," Exerc Sport Sci Rev, Jul. 2000, vol. 28, No. 3, pp. 99-107, one page.

Cavagna et al., "Mechanical Work in Terrestrial Locomotion: Two Basic Mechanisms for Minimizing Energy Expenditure," American Journal of Physiology, 1977, vol. 233, R243-261.

Cavagna, G.A. et al., "Mechanical Work and Efficiency in Level Walking and Running", J. Physiol (London), 1977, 268, 467-481.

Cavagna, G.A. et al., "Pendular Energy Transduction within the Step in Human Walking", J. Exp. Biol., Jul. 11, 2002, 205, 3413-3422.

Chansirinukor et al., "Effects of Backpacks on Students: Measurement of Cervical and Shoulder Posture," Australian Journal of Physiotherapy, 2001, vol. 47, No. 2, pp. 110-116.

Davies et al., "Maximal Mechanical Power Output of Cyclists and Young Adults," European Journal of Applied Physiology, 1989, vol. 58, pp. 838-844.

De Gaspari et al., "Hot Stuff, Advanced Materials are moving out of the Lab and Into the Commercial World," Mechanical Engineering, Dec. 2002, pp. 32-35.

Drake, "The Greatest Shoe on Earth," Feb. 2001, Wired, pp. 90-100.

Engsberg et al., "Comparison of Effort Between Below-Knee Amputee and Normal Children," Journal of the Association of Children's Prosthetic-Orthotic Clincs, 1991, 26(2), pp. 46-53.

Fedak et al. "One-step N2-Dilution technique for calibrating Open-Circuit VO2 Measuring Systems," Journal of Applied Physiology, Apr. 13, 1981, R51, pp. 772-776.

Ferguson, R.A. et al., "Muscle Oxygen Uptake and Energy Turnover during Dynamic Exercise at Different Contraction Frequencies in Humans", J. Physiol (London), May 21, 2001, 536, 261-271.

Franklin et al., "ACSM's Guidelines for Exercise Testing and Prescription," 6th Edition, No Month or Year Available, p. 303.

Gard, S.A. et al., "Comparison of Kinematic methods for Computing the Vertical Motion of the Body Center of Mass During Walking", Hum Mov Sci, 2004, 22, 597-610.

Gonzalez et al., "Human Powered Piezoelectric Batteries to Supply Power to Wearable Electronic Devices," International Journal of the Society of Materials Engineering for Resources, 2002, vol. 10, pp. 34-40.

Good, "Effects of Controlled Vertical Motion in Load Carriage Systems," Queen's University of Kingston, Ontario, Canada, Sep. 2003, 185 pages.

Grabowski, A. et al., "Independent Metabolic Costs of Supporting Body Weight and Accelerating Body Mass during Walking," J. Appl. Physiol, Feb. 2005, vol. 98, 579-583.

Hargood, N.W. et al., "Development of Micro-Hydraulic Transducer Technology", 10th International Conference on Adaptive Structures and Technologies, 1999.

Heglund et al., "Energetics and Mechanics of Terrestrial Locomotion. IV. Total Mechanical Energy Changes as a Function of Speed and Body Size in Birds and Mammals," Journal of Experimental Biology, 1982, vol. 97, pp. 57-66.

Hirano et al., "Jumping Performance of Frogs(*Rana pipiens*) as a Function of Muscle Temperature," Journal of Experimental Biology, 1984, vol. 108, pp. 429-439.

Holt et al., "Increased Musculoskeletal Stifness During Load Carraige at Increasing Walking Speeds Maintains Constant Vertical Excursion of the Body Center of Mass," Journal of Biomechanics, 2003, vol. 36, pp. 465-471.

Hong et al., "Gait and Posture Responses to Backpack Load during Level Walking in Children," Gait and Posture, Jan. 16, 2002, vol. 17, No. 1, pp. 28-33.

Hong Kong Society for Child Health and Development., "The Weight of School Bags and its Relation to Spinal Deformity," Hong Kong: The Department of Orthopedic Surgery, University of Hong Kong, The Duchess of Kent Children's Hospital, 1998.

Kargo, W.J. et al., "Functional Morphology of Proximal Hindlimb Muscles in the Frog", J. Exp. Biol, May 3, 2002, vol. 205, 1987-2004.

Kargo, W.J. et al., "Jumping in Frogs: Assessing the Design of the Skeletal System by Anatomically Realistic Modeling and Forward Dynamic Simulation", J. Exp. Biol, Mar. 25, 2002, vol. 205, 1683-1702.

Kim, H.W. et al., "Energy Harvesting Using a Piezoelectric Cymbal Transducer in Dynamic Environment", Japanese Journal of Applied Physics, 2004, 43(9A), 6178-6183.

Kram "Carrying Loads with Springy Poles," Journal of Applied Physiology, 1991, vol. 71, No. 3, pp. 1119-1122.

Kymissis et al., "Parasitic Power Harvesting in Shoes," IEEE Int'l Conference Wearable Computing, 1998, pp. 132-139, one page.

LaFriandra et al., "The Effect of Walking Grade and Backpack Mass on the Forces Exerted on the Hips and Shoulders by the Backpack," United States Army Research Institute of Environmental Medicine. United States Science Conference, 2002, 2 pages.

Lesieutre, G.A. et al., "Damping as a Result of Piezoelectric Energy Harvesting", Journal of Sound and Vibration, Jan. 2004, 269(22), 991-1001.

Liu, Y. et al., "Investigation of Electrostrictive Polymers for Energy Harvesting", IEEE Transactions on Ultrasonics, Ferroelectrics, and Frequency Control, 2005, 52, 2411-2417.

Liu, Y., "Active Energy Harvesting", Ph.D. Dissertation, The Pennsylvania State University, Dec. 2006.

Lutz et al., "Built for Jumping: The Design of the Frog Muscular System," Science, Jan. 21, 1994, vol. 263, pp. 370-372.

Martin, "Inertial-load Method Determines Maximal Cycling Power in a Single Exercise Bout," Medicine and Science in Sports and Exercise, 1997, vol. 29, No. 11, pp. 1505-1512.

Mitcheson, PD. Et al., "Architectures for Vibration-Driven Micropower Generators", Journal of Microelectromechanical Systems, 2004, 13, 429-440.

Modica, JR. et al., "Metabolic Energy and Muscular Activity Required for Leg Swing in Running", J. Appl. Physiol, Jan. 28, 2005, vol. 98, 2126-2131.

Negrini et al., "Backpack as a Daily Load for Schoolchildren," The Lancet, Dec. 4, 1999, vol. 354(9194), 1 page.

Negrini, et al., "Backpacks On! Schoolchildren's Perception of Load, Associations with Back Pain and Factors Determining the Load", Spine, 2002, 27(2), 187-195.

Ottman, G.K. et al., "Adaptive Piezoelectric Energy Harvesting Circuit for Wireless Remote Power Supply", IEEE Transactions on Power Electronics, 2002, 17, 669-676.

Ottman, G.K. et al., "Optimized Piezoelectric Energy Harvesting using Step-Down Converter in Discontinuous Conduction Mode", IEEE Transactions on Power Electronics, 2003, 17, 696-703.

Park, SE, et al., "Ultrahigh Strain and Piezoelectric Behavior in Relaxor based Ferroelectric Single Crystals", J. Appl. Phys., 1997, 82, 1804.

Pascoe et al., "Influence of Carrying Book Bags on Gait Cycle and Posture in Youths," Ergonomics, No Month Available, 1997, vol. 40, No. 6, pp. 631-641.

Pelrine, et al., "Dielectric Elastomers: generator Mode Fundamentals and Applications", Proceedings of SPIE—The International Society for Optical Engineering, 2001, 4329, 148-156.

Roberts et al., "Muscular force in Running Turkeys: The Economy of Minimizing Work," Science, Feb. 21, 1997, vol. 275, pp. 1113-1115.

Rome, L.C. et al., "Generating Electricity while Walking with Loads", Science, 2005, 309, 1725-1728.

Saltin et al., "Maximal Oxygen Uptake in Athletes," Journal of Applied Physiology, Sep. 1967, vol. 23, pp. 353-358.

Shearer, T.L. et al., "Sensorless Control of a Thermoacoustic Refrigerator", Journal of the Acoustical Society of America, Jul. 2004, 116(1), 288-293.

Shenck, N.S. et al., "Energy Scavenging with Shoe-Mounted Piezoelectrics", IEEE, 2001, 30-42.

Starner, T et al., "Human Generated Power for Mobile Electronics", Low Power Electronics Design, CRC Press, Fall 2004, pp. 1-30.

Taimela et al., "The Prevalence of Low Back Pain Among Children and Adolescents. A Nationwide, Cohort-based Questionnaire Survey in Finland," Spine, May 15, 1997, vol. 22, No. 10, pp. 1132-1136.

Taylor et al., "The Energetic Cost of Generating Muscular Force During Running," Journal of Experimental Biology, 1980, vol. 86, pp. 9-18.

Troussier et al., "Back Pain in School Children a Study Among 1178 Pupils," Scandanavian Journal of Rehabilitation Medicine, 1994, vol. 26, pp. 143-146, one page.

Vacheron et al., "The Effect of Loads Carried on the Shoulders," Military Medicine, Aug. 1999, vol. 164, No. 8, pp. 597-599, one page.

Vandewalle et al., "Force-Velocity relationship and Maximal Cycling Power on a Cycle Ergometer Correlation with the Height of a Vertical Jump," European Journal of Applied Physiology, 1987, vol. 56, pp. 6650-6656.

Xia et al., "High Electromechanical Responses in Terpolymer of Poly(vinylidene fluoride trifluoethylene-chlorofluroethylene," Adv Masters, Nov. 4, 2002, vol. 14, pp. 1574-1577.

* cited by examiner

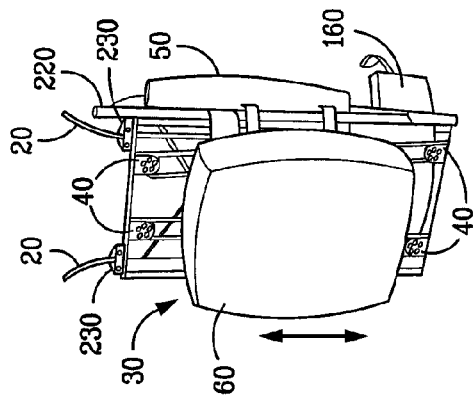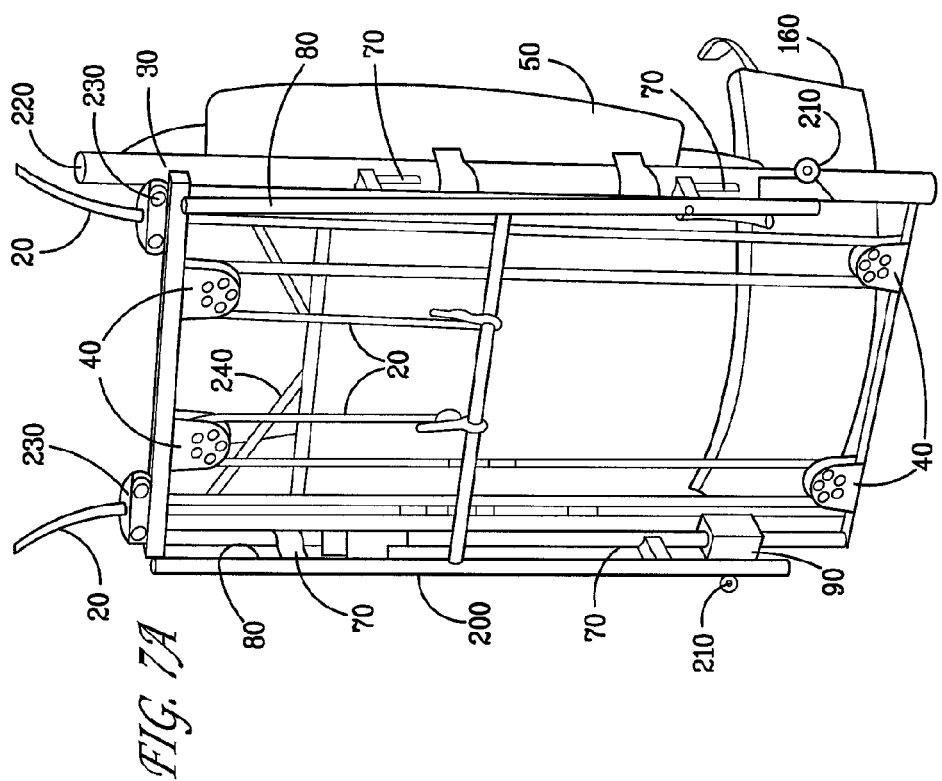

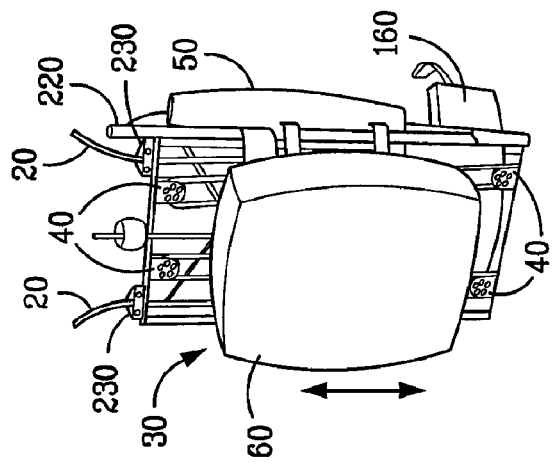
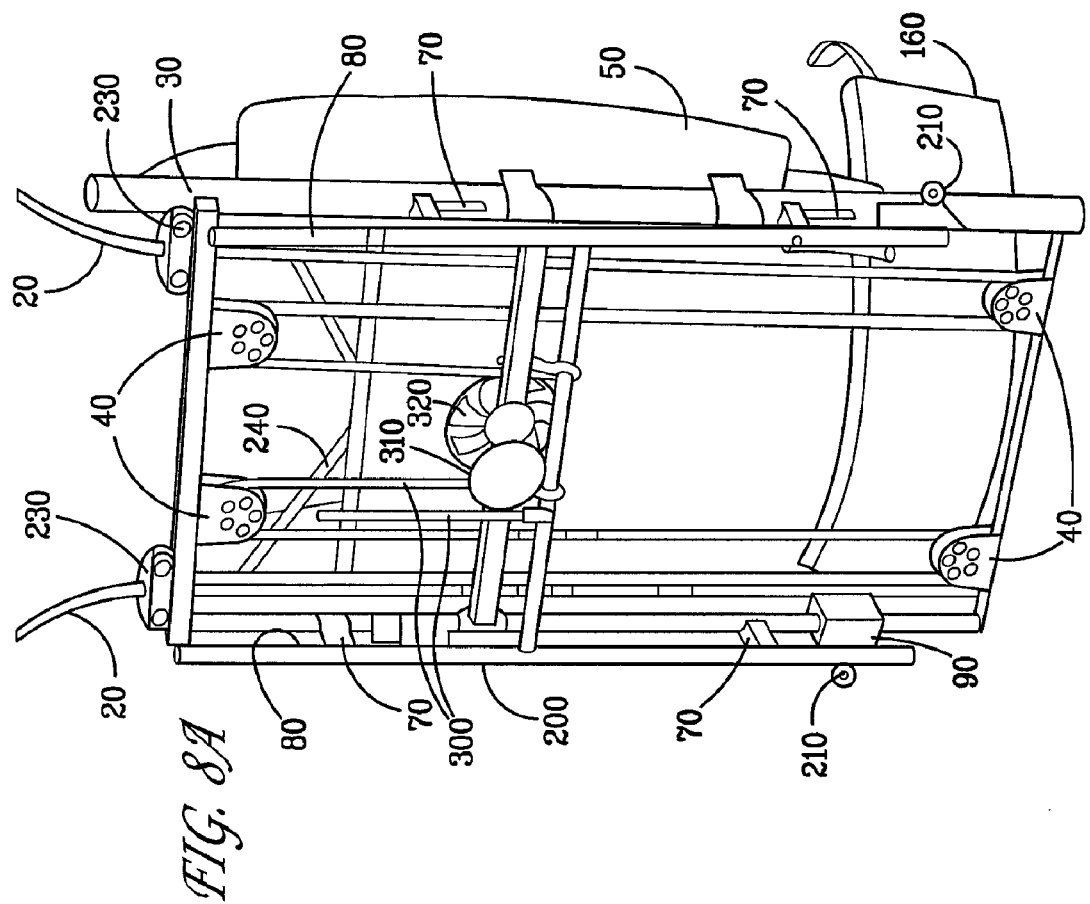

SUSPENDED LOAD ERGONOMIC BACKPACK

CROSS-REFERENCE TO RELATED APPLICATIONS

The present application claims priority under 35 U.S.C. §119(e) to U.S. Provisional Patent Application Ser. Nos. 60/875,092 and 60/875,238, filed Dec. 14, 2006, the contents of which are incorporated herein by reference. The present application is also a continuation-in-part application of U.S. patent application Ser. No. 11/056,849, filed Feb. 11, 2005, which is a divisional application of U.S. Ser. No. 10/803,112, filed Mar. 17, 2004, now U.S. Pat. No. 6,982,497, which, in turn, claims benefit to U.S. Provisional Patent Application Ser. No. 60/455,477, filed Mar. 17, 2003, the entire contents of which are herein incorporated by reference.

STATEMENT REGARDING FEDERALLY SPONSORED RESEARCH OR DEVELOPMENT

This invention was made with government support under N00014-03-1-0568 and N00014-06-M-0309 awarded by the Office of Naval Research and under Grant Nos. AR46125, AR38404 and R43HD55110 awarded by the National Institutes of Health. The government has certain rights in the invention.

FIELD OF THE INVENTION

The invention relates to an ergonomic backpack and, more particularly, to a backpack that suspends the load from a frame that moves up and down relative to the wearer's body as the wearer walks or runs so as to significantly reduce the forces on the wearer's body.

BACKGROUND OF THE INVENTION

First by using domesticated animals and then by using machines (e.g., planes, trains, and automobiles), humans have sought ways to reduce the weight they must personally carry. Even so, humans seem destined to continue to transport considerable weights of food, clothing, medicines, books and tools wherever they go. On a smooth, even surface, such as an airport terminal, people can use wheels to move their loads from one place to another. On uneven terrain or in the wilderness, however, small wheels are ineffective. Hence, the ubiquitous backpack remains the preferred solution to move loads around with us.

Backpacks, however, have their own limitations. When standing still, the static force of the backpack is simply equal to the weight of the backpack. However, peak forces exerted on the body can increase dramatically to as much as 2-3-fold greater than the static force when one starts to walk or run while wearing the backpack. This increase is due to the requisite alternate deceleration and reacceleration of the load which must track the vertical movement of the hips on every step. These high, sometimes jarring, peak forces make it difficult to move at high speeds with large loads, and may also contribute to the muscular and orthopedic injury suffered by those carrying heavy weights relative to their body mass. In addition, there is a large increase in metabolic rate associated with walking (or running) with a load.

The hip rises 5-7 cm on each step. In a normal backpack, that would raise the load by 5-7 cm on each step. Raising the load requires that the frame exert an accelerative force on the load, and the load, in turn, exerts a downward force on the shoulders and body. This downward force also leads to increased ground reaction force pushing up at the foot-ground contact, and thereby increases force on the joints. The peak force can increase considerably. FIGS. 1A and 1B show that during walking at a fast pace, the peak force can increase to almost 2-fold larger (1.7 fold is shown) than the static or average force. During running, the peak force increases to 3-fold over the static force (FIGS. 2A and 2B).

This increase in force has large consequences. In the case of running, the increased force puts very high forces on the joints resulting in orthopedic and muscle pain and injury. A similar effect has been seen in soldiers with backpacks jumping out of trucks, during which the high forces incurred can lead to broken ankles. To eliminate these accelerative forces, it is necessary to keep the load from moving in the vertical plane to reduce dynamic forces on the body.

Because of our reliance on backpacks to carry loads, greater economy, lower dynamic forces and somewhat faster speeds (as well as potentially greater endurance), can have a wide range of health and societal benefits. The large weight of backpacks carried by children is well recognized to be a significant international public health problem, and reduction in dynamic forces may reduce muscle and orthopedic injury. The reduction in dynamic forces and improved economy are important to adults, particularly those carrying very heavy loads such as first responders, disaster relief workers, fire fighters, explorers, field scientists, and soldiers. Furthermore, in some of these cases, the ability to carry equipment to the disaster/emergency site faster could be the difference between success and failure. Finally, a more joint-friendly manner to carry smaller weights in young, middle-aged and aged populations, may reduce orthopedic injury to walkers, hikers, runners, golfers, and other athletes, thereby permitting lifelong mobility, and hence better health.

A backpack addressing many of these needs has been described in the aforementioned parent applications from which the present application claims priority. Subsequent research has revealed additional attributes desirable for a commercially viable ergonomic suspended-load backpack. The present application is directed to an ergonomic backpack having such attributes.

SUMMARY OF THE INVENTION

To help solve the above-mentioned problems, a suspended-load ergonomic-backpack has been developed that dramatically reduces the dynamic forces on the body (e.g., 82-86%) and consequently reduces the metabolic rate for carrying the load (e.g., by 40 W for a 60 lb load), providing the ability to carry significantly greater loads for the same metabolic cost (5.3 Kg more). The suspended-load ergonomic backpack of the invention can be used to transport loads more quickly and more comfortably at running speeds—in contrast with a conventional backpack where running with a heavy load is essentially impossible.

The suspended-load ergonomic backpack with such attributes includes shoulder straps, a load storage bag (pack body) for accepting a load to be carried by the backpack; and a suspension system having a first portion connected to the shoulder straps and a second portion connected to the load storage bag. In exemplary embodiments, the suspension system incorporates a compliant mechanism that permits the second portion of the suspension system and the load storage bag to move up, relative to the first portion of the suspension system, when a gait of a wearer of the backpack causes the first portion to move downward relative to the ground and to move down, relative to the first portion of the suspension system, when the gait of the wearer of the backpack causes the first portion of the suspension system to move upward relative to the ground, thereby reducing up and down motion of the load relative to the ground during the gait of the wearer of the backpack.

In the exemplary embodiments, the compliant mechanism comprises a bungee cord connected on one end to the first portion of the suspension system and on another end to the second portion of the suspension. The bungee cord is routed over low-friction pulleys so that the bungee cord is stretched a lower percentage of the stretch at equilibrium. The first portion of the suspension system includes a first frame that has vertical rods for accepting bushings that move up and down the vertical rods. The second portion of the suspension system includes a second frame connected to the bushings for permitting the second portion of the suspension system to move relative to the first portion of the suspension system by virtue of the bushings moving on the vertical rods. The first and second frames are preferably formed of very light materials such as aluminum tubing. In an exemplary embodiment, the first frame comprises at least two vertical rods connected to each other by a horizontal bar, and the second frame comprises an H-frame comprising vertical rods connected to the bushings and a horizontal bar connecting the vertical rods of the H-frame. The load storage bag is ideally connected to the vertical bars of the H-frame, while the compliant mechanism is connected to the horizontal bar of the H-frame.

The compliance of the compliant mechanism is selected to prevent resonance with the up/down movement of the load. Preferably, a natural frequency of the compliant mechanism is below a frequency of up/down movement of the second frame relative to the first frame or the step frequency of the wearer. Also, a compliant mechanism is selected that may dissipate energy so as to prevent resonance as a result of up/down movement of the second frame relative to the first frame. The compliant mechanism also may be connected to a top and a bottom portion of the first portion of the suspension system to increase its spring constant. The suspension system may also include adjustment means, such as a cleat, for adjusting the stiffness of the compliant mechanism by, for example, adjusting the length of the bungee cord between the first and second portions of the suspension system.

The suspension system may connect directly to the shoulder straps or through an interface assembly that connects the first portion of the suspension system to the shoulder straps and/or a hip belt so as to permit adjustment of the shoulder straps and/or hip belt to the suspension system based on trunk length of the wearer. These and other characteristic features of the invention will be apparent to those skilled in the art based on the following detailed description of the invention.

BRIEF DESCRIPTION OF THE DRAWINGS

The above and other objects and advantages will become apparent to one skilled in the art based on the following detailed description of the invention, of which:

FIGS. 7A and 7B illustrate an ergonomic backpack mounted on an external frame in accordance with another embodiment of the invention.

FIGS. 8A and 8B illustrate the embodiment of FIG. 7 with a fan for dissipating the excess mechanical energy and cooling the wearer.

DETAILED DESCRIPTION OF ILLUSTRATIVE EMBODIMENTS

Figure 1A:
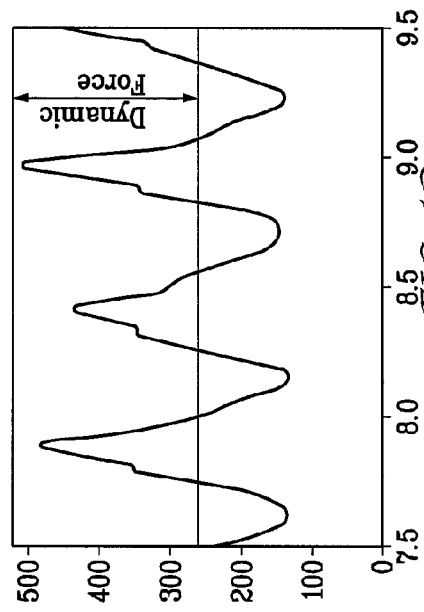
FIGS. 1A and 1B illustrate that during walking at a fast pace, the peak force can increase to almost 2-fold larger (1.7 fold is shown) than the static or average force as a result of the load oscillating with the movement of the wearer.
Figure 1B:
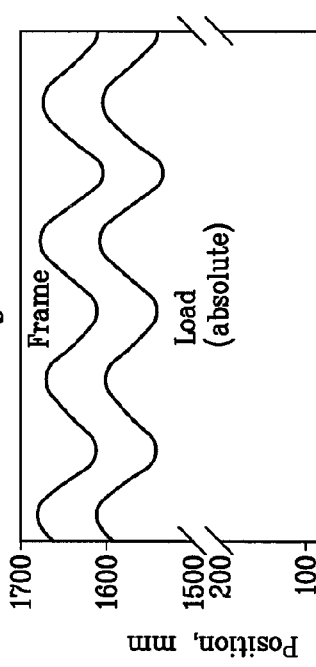

A detailed description of illustrative embodiments of the present invention will now be described with reference to FIGS. 1-18. Although this description provides detailed examples of possible implementations of the present invention, it should be noted that these details are intended to be exemplary and in no way delimit the scope of the invention.

The suspended-load ergonomic backpack of the invention reduces the dynamic forces on the body by suspending the load from the backpack frame. Then, as the frame moves up by 5-7 cm during a step of the wearer, a compliant coupling is designed to stretch by a similar distance. This principle has been historically exploited by Asian merchants running with springy bamboo poles as described by Kram in an article entitled "Carrying Loads With Springy Poles," *Journal of Applied Physiology*, Vol. 71(3), pp. 1119-22 (1991). To achieve this condition in the more compact backpack, a long compliant coupling is introduced for attaching the load to the frame. As the frame moves up 5 cm with the hip, the load moves downwards within the frame the same distance, thereby stretching the coupling by 5 cm. To limit the peak dynamic force to about 10% over the static force, a coupling is selected such that the 5 cm stretch represents only about 10% of the distance stretched at equilibrium. In the exemplary embodiments of a suspended-load backpack 10 shown in FIGS. 3 and 7, bungee cords 20 are used that stretch 50-70 cm when a 60 lb mass is attached. To accommodate the coupling into a conventional (approximately 67 cm) backpack where the overall stretched length of the bungee cords are about 1.8 m, a ½ inch bungee cord was run over five low friction pulleys 40, traversing a frame of a suspension system 30 two and one-half times as illustrated in FIGS. 4 and 7. As best illustrated in FIG. 7, the backpack also may be fitted with a lock 210 that, when engaged, converts the suspended-load ergonomic backpack into a conventional rigid backpack.

Another criterion for the system to work to reduce the load on the wearer is that the load should not oscillate. If the load starts to oscillate considerably, then some damping would have to occur, either electronically (with a motor) or by a mechanical mechanism such as friction. Large losses of mechanical energy during damping would require the mechanical energy to be put back in. This would require mechanical work by the muscle and increased metabolic rate. To avoid this, the natural frequency of the oscillation ($\sqrt{K/m}$, where k is the spring constant and m is mass) would need to be set well below the frequency of movement so that there will be no resonance, and the material may be somewhat dissipative. The bungee cords 20 as in the embodiment of FIGS. 3 and 7 have these characteristics. For example, their long lengths provide a low spring constant, k, and the rubber and the covering of a bungee cord are known to be dissipative and to dissipate a small amount of energy that prevents resonance from starting. Hence very little mechanical energy is removed from the system and hence little must be added back to the system.

Figure 1C:
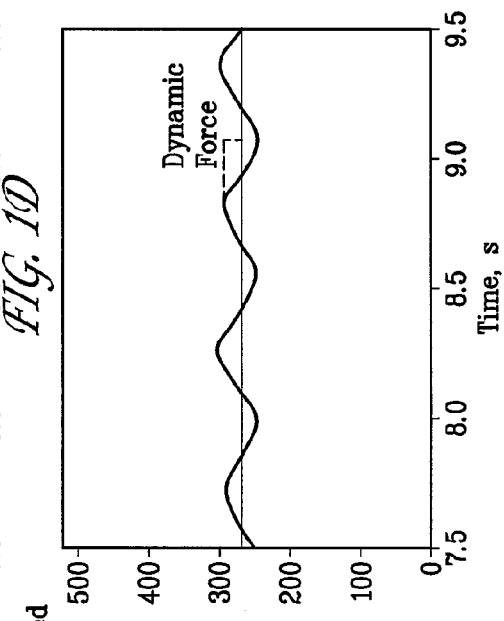
FIGS. 1C and 1D illustrate the reduction in the force on the wearer when walking wearing the backpack of the embodiment of FIG. 7.
Figure 1D:
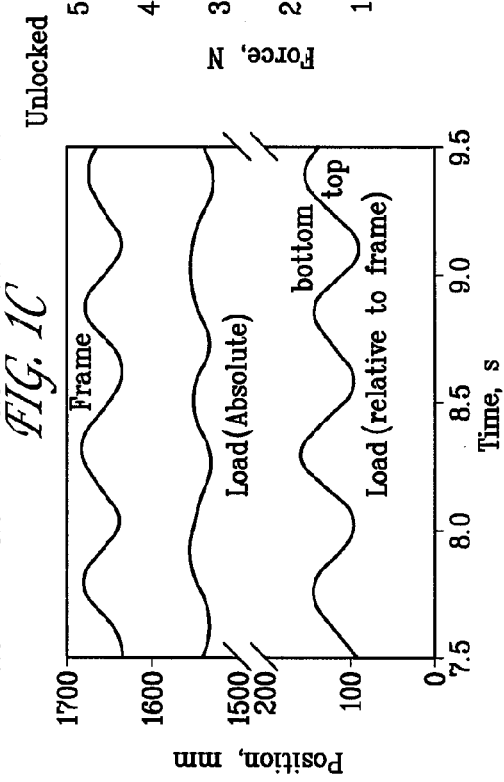
Figure 2A:
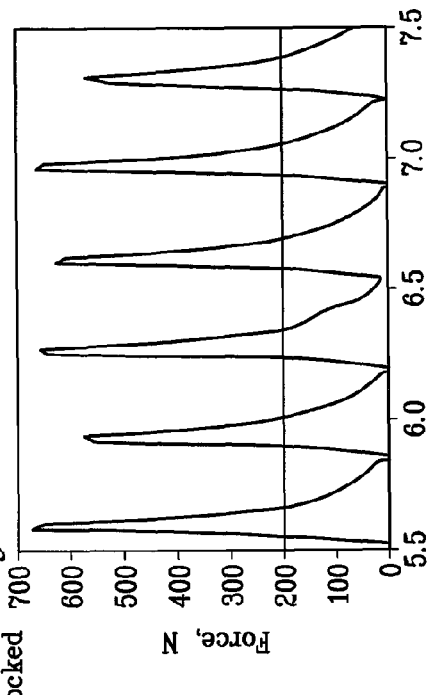
FIGS. 2A and 2B illustrate that during running, the peak force can increase to almost 3-fold larger over the static force as a result of the load oscillating with the movement of the wearer.
Figure 2B:
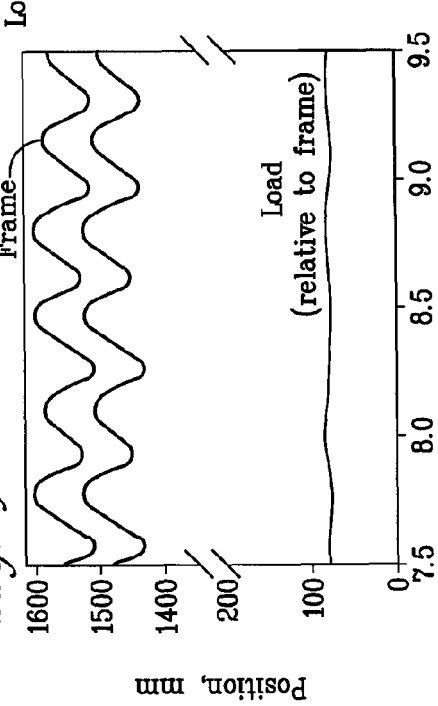
Figure 2C:
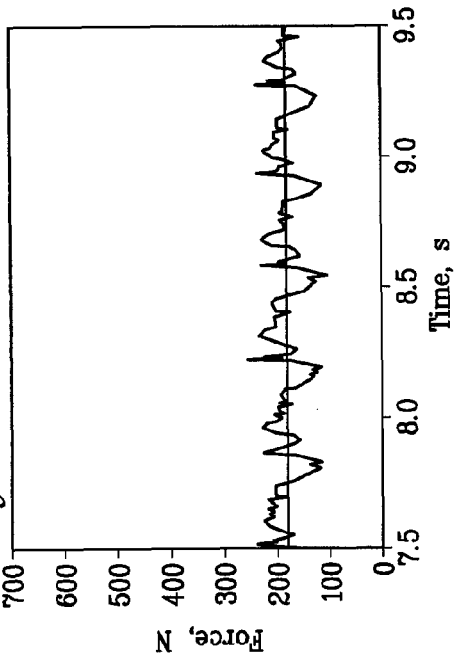
FIGS. 2C and 2D illustrate the reduction in the force on the wearer when running wearing the backpack of the embodiment of FIG. 7.
Figure 2D:
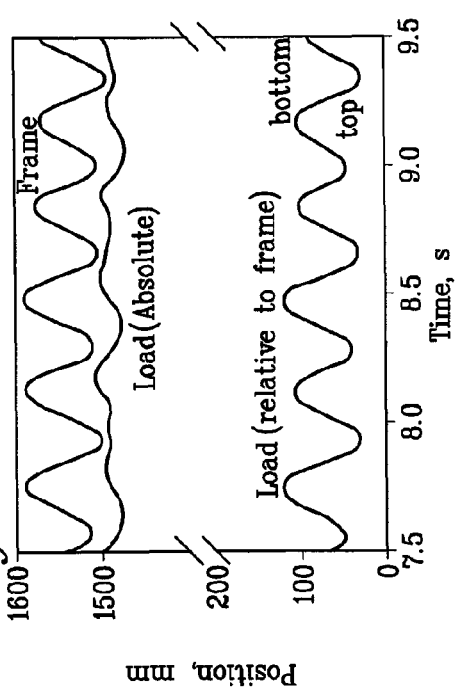

By way of example, the ergonomic backpack of FIG. 7 has been found to reduce the accelerative force by 82% during walking as shown in FIG. 1D as a result of the limiting of the absolute movement of the load relative to ground as illustrated in FIG. 1C. This not only reduces the forces on the shoulders, but also reduces the downward force on the body and hence the upward ground reaction force. This has two effects. It reduces the force on the joints and also reduces mechanical energy losses. The lower mechanical energy losses reduce the actual metabolic power need for walking with a load. For example, while carrying a 60 lb load, there is a reduction in 40 W metabolic power. Hence, a wearer of the suspended-load ergonomic backpack of the invention will be able to walk using a smaller metabolic rate. Given the big push to reduce the weight that is being carried by hikers, this is an opportunity to carry more weight for less (force and metabolic rate). As described by one of the present inventors in Rome et al., "Rubber bands reduce the cost of carrying loads," Nature, 2006, 444:1023-1024, this permits an individual to carry 12 extra pounds for free, that is, the cost of carrying 48 lbs in a normal backpack is the same as carrying 60 lbs in the suspended-load ergonomic backpack of the invention.

Equally striking is that the suspended-load ergonomic backpack of the invention reduces the accelerative forces by 86% during running. Running or jumping with heavy loads is extremely harmful to joints. For instance, soldiers in Iraq often break their ankles jumping out of trucks with a heavy backpack. This is even more of a problem from high distances during training. In fact, running any distance with a large weight often results in knee and ankle injury because the of the 3-fold higher forces experienced (see FIG. 2B). As evidenced by data taken from the testing of the backpack of FIG. 7, the suspended-load backpack of the invention permits running with backpacks with significantly reduced forces on the body (see FIGS. 2C and 2D), which is very useful for first responders, disaster relief and military applications. Further, even if more conventional equipment must be used during the actual mission, the suspended-load backpack provides an excellent tool for training, where considerable injury can occur.

Those skilled in the art will appreciate that when running with a backpack it may be necessary to remove some mechanical energy. This can be accomplished by the use of any frictional device, including, but not limited to, a generator producing electricity or a fan that could be blow air on the wearer to provide some cooling. Examples of backpacks with such devices are provided in the afore-mentioned priority U.S. Pat. No. 6,982,497. Such devices may be advantageously used with the present invention to remove mechanical energy and to optionally convert the mechanical energy into electricity using, for example, a rack and pinion and electricity generator in a known fashion as shown in FIG. 8, for example.

Several embodiments of the invention will be described below. Each embodiment is characterized by a suspension system from which the load is suspended whereby the load moves relative to a portion of the frame attached to the body so as to limit movement of the load in the vertical plane relative to ground during walking or running. To limit the movement of the load relative to the ground, each embodiment of the invention preferably includes one or more (preferably all) of the following characteristics:

1. The Load Needs to be Able to Freely Move 5-7 cm with Low Friction.

Any friction affecting the load, such as rubbing against the wearer's body, will lead to less counter-movement of the load with respect to the frame, and hence larger displacement with respect to the ground and therefore larger accelerations and higher forces. It is desirable that the load move with low friction to reduce the displacement with respect to the ground and to thus minimize the forces applied to the body. This is can be achieved a multitude of ways by connecting the load to the frame via bearing races, bearings around a rod (FIG. 3), using wheels, or by using a lever system that principally allows the load bag to move vertically with little side-to-side motion.

2. The Load Must be Suspended with a Compliant Coupling.

Suspending the load with respect to the frame using a compliant coupling permits the 5-7 cm displacement of the load within the frame (and hence stretch of the coupling), with no more than 10-15% increase in force over and above the static weight. This keeps the forces on the body low and prevents resonance (i.e., provides low stiffness, K). This can be achieved by lacing a bungee cord over pulleys in several lengths of the backpack frame and utilizing low friction pulleys as illustrated in FIGS. 4 and 7, for example. It could also be achieved using a torsional spring at the top and other spring arrangements known to those well-versed in the art.

3. Using Slightly Dissipative Material as the Compliant Coupling Prevents Resonance.

As noted above, the rubber in a bungee cord as well as in its covering dissipates a small amount of energy, which helps prevent resonance. If the material is not dissipative (e.g., metal springs) a small amount of friction can be added into the system if necessary to dissipate some energy to prevent resonance.

4. The Natural Frequency of the Load-coupling System Should be Set Below the Walking/running Frequency to Prevent Resonance.

Walking occurs with a step frequency of about 1.3 Hz. The frequency increases to over 3 Hz during running. To prevent resonance, the natural frequency of the coupling system of the backpack ($\sqrt{K/m}$, where k is the spring constant (stiffness)

and m is mass) should be set at 1 Hz or below. A low k is equivalent to a high compliance.

5. Effective Suspension can be Achieved with Only One Compliant Coupling from the Top of the Backpack Frame.

It is unnecessary to have springs or couplings on both the top and bottom of the backpack frame. A lower frequency is achieved by using only a compliant coupling from the top. In some configurations, it may be necessary to dampen the compliant coupling during running; however, with different couplings in different configurations, dampening of the coupling may not be necessary.

Day Pack Embodiment

An ergonomic backpack was described in U.S. Pat. No. 6,982,497 and is described with respect to FIG. 7 below that was based on a full sized backpack with an external frame. However, there are many applications where a suspended-load day pack without a bulky external frame would be most useful. For example, student day packs are designed to fit into book lockers that do not accommodate the external frames. A design of a day pack in which the load is suspended from the frame using an elastic element is provided in the embodiment of FIGS. 17-18 of U.S. Pat. No. 6,982,497. In that embodiment, the load moves freely and is constrained only by the outer shell containing the load storage bag. Though useful, such an embodiment is not particularly desirable for some applications since it would not have sufficient compliance to keep the load stationary. Also, the bag within a bag arrangement leaves puffy jackets that fill up all the space and cause friction between the outside of the internal back and the inside of the outside bag, preventing the low friction movement that is necessary for optimal operation.

Figure 4A:
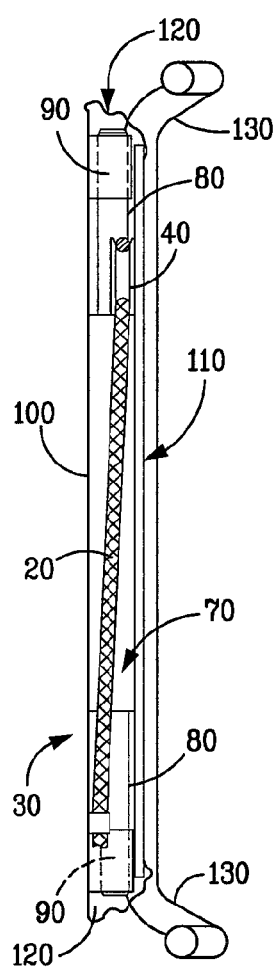
FIGS. 4A-4C respectively illustrate side, front and bottom views of the ergonomic suspension system for the day pack of FIG. 3.
Figure 4B:
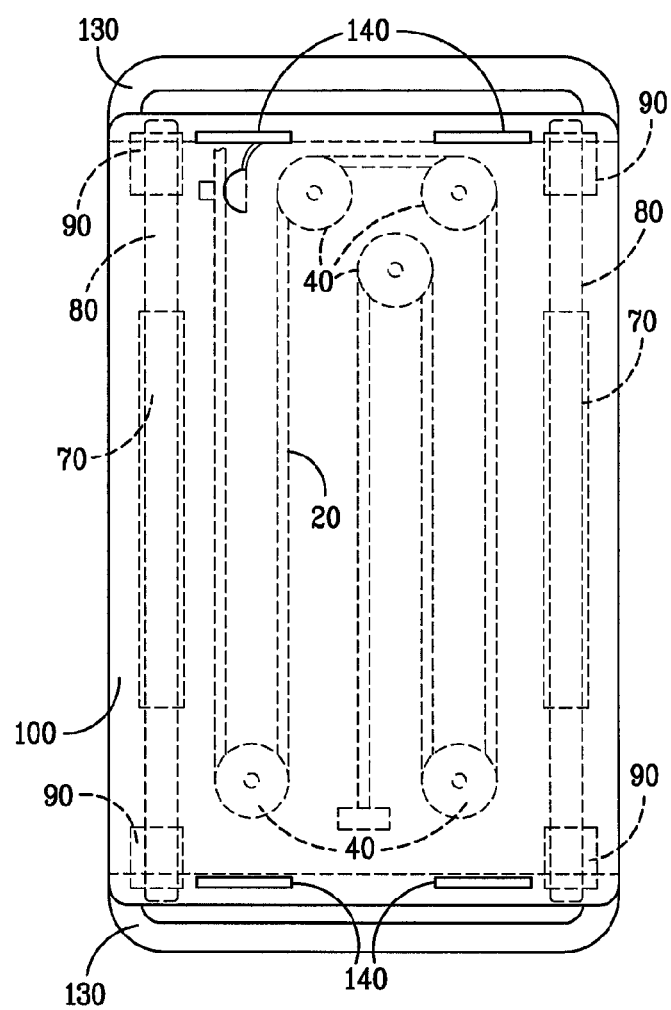
Figure 4C:
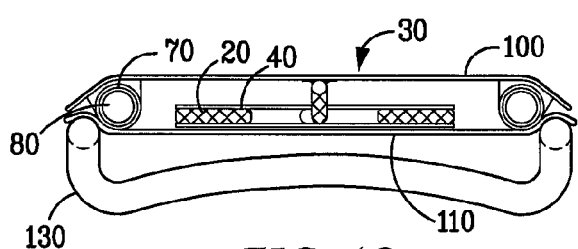
Figure 5:
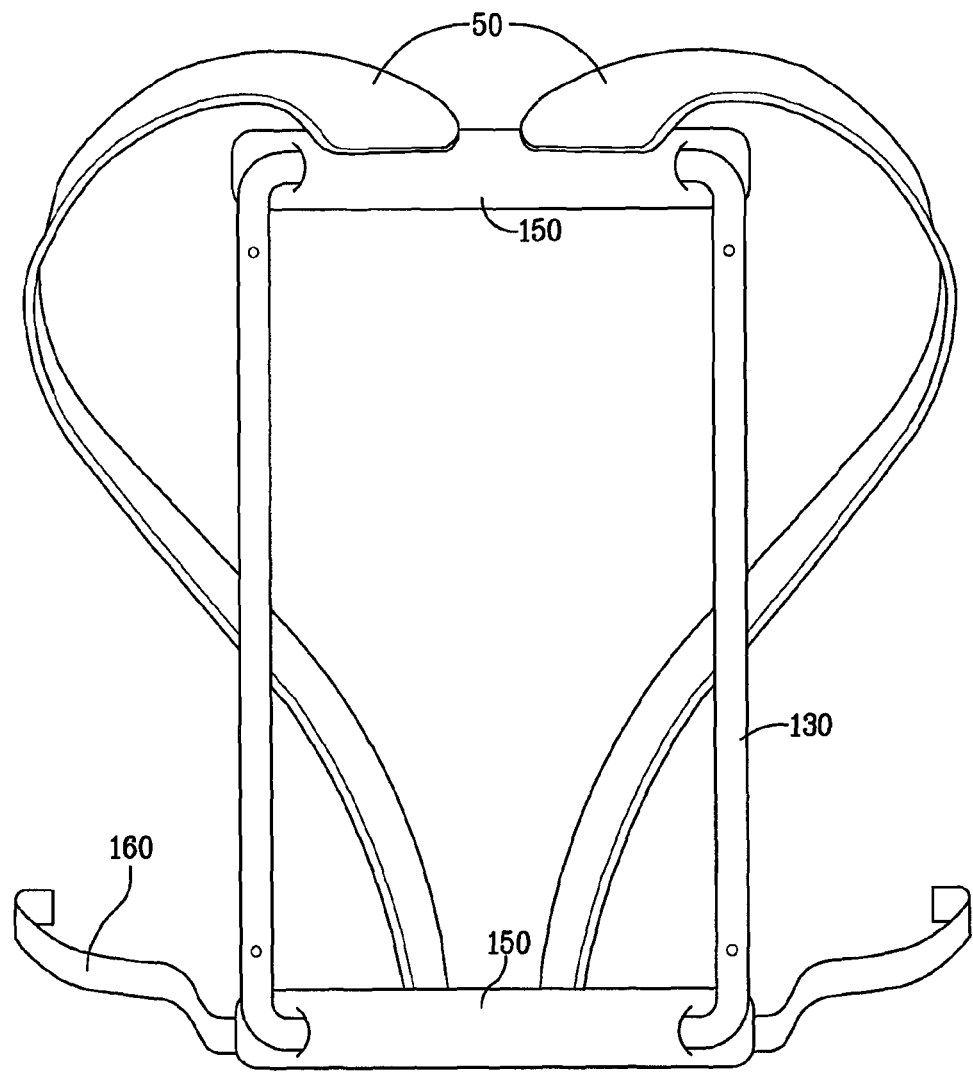
FIG. 5 illustrates the portion of the harness portion that connects to the suspension system for supporting the backpack on the wearer via shoulder and optionally waist straps.
Figure 6A:
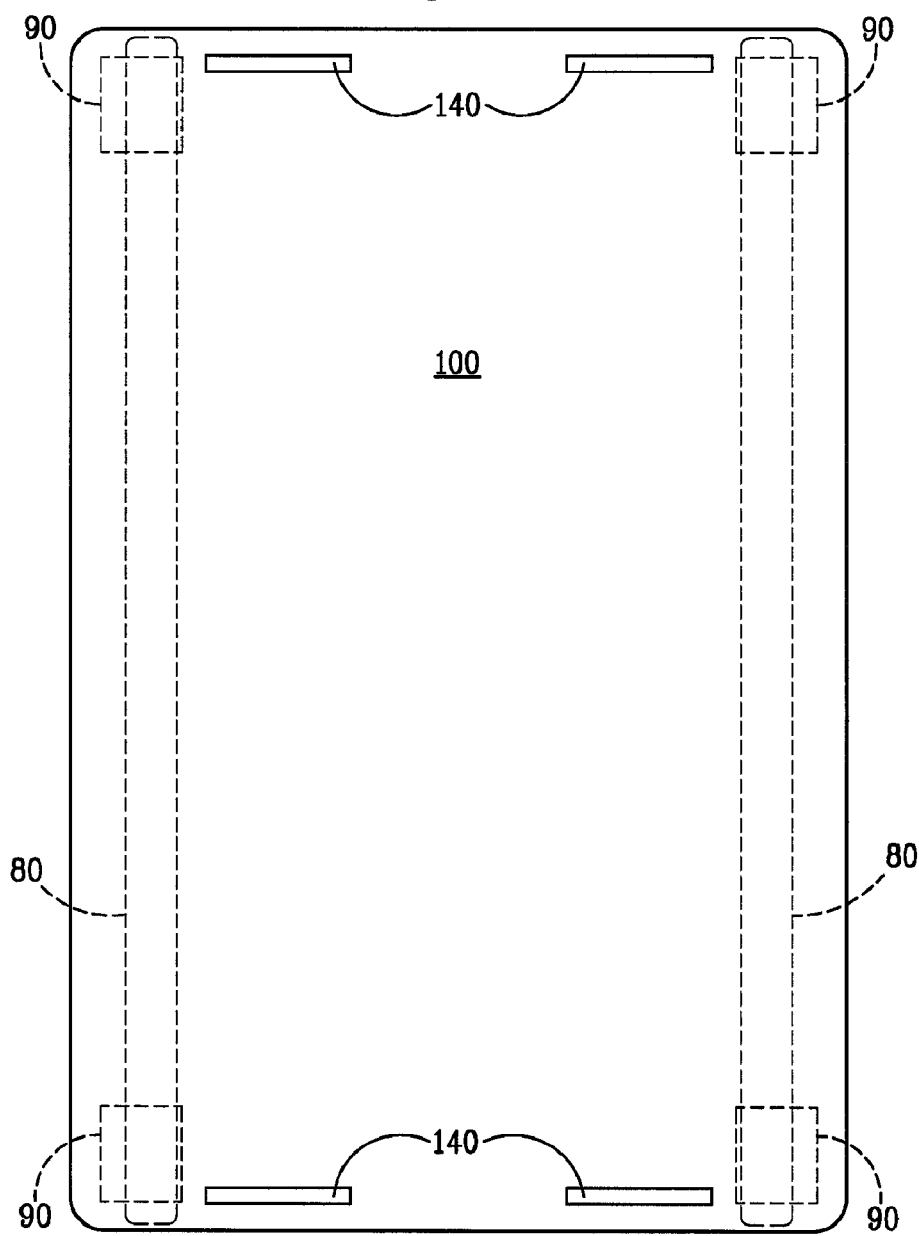
FIGS. 6A and 6B illustrate an embodiment in which the moving portion of the frame is a plate with slots for mounting the load storage bag.
Figure 6B:
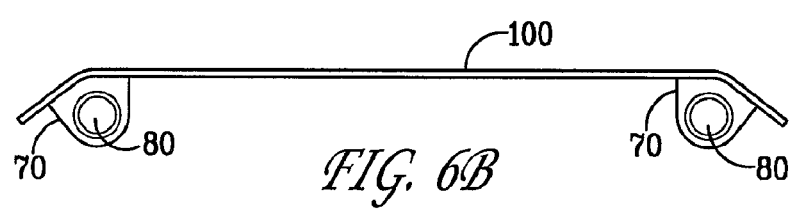

These problems are solved in accordance with the day pack embodiment of the invention by suspending the entire load carrying bag from a suspension system having two frames, one relatively fixed to the body, and a moving frame that supports the load and moves relative to the fixed frame by virtue of the give in the compliant coupling. Such an embodiment is illustrated in FIGS. 3-6. The illustrated suspended-load backpack 10 includes a suspension system 30 including a compliant coupling, such as the illustrated bungee cord 20 wrapped around low-friction pulleys 40 to allow the load to move relative to the fixed portion of the suspension system 30. As illustrated, the suspension system 30 is connected directly or indirectly to shoulder straps 50 (and optionally waist straps 160 as shown in FIG. 5) on one side and, on the opposite side, to the load storage bag 60 for carrying the load. As best illustrated in FIG. 4B, the suspension system 30 comprises a suspension cassette containing the compliant coupling, for example, a bungee cord 20 that is run over several low friction pulleys 40 to get the length necessary for the large compliance as noted above. The suspension system 20 also includes bushings 70 that run up and down vertical rods 80. Vertical movement of bushings 70 on vertical rods 80 is limited by stops 90 at the top and bottom of the vertical rods 80. A moving plate 100 made of a light, but sturdy, materials such as aluminum is connected so as to move up and down with the bushings 70 as they slide on the vertical rods 80 as a result of the load in the load storage bag 60 connected to the plate 100 using slots 140 (see FIGS. 4B and 6). A fixed plate 110 may optionally be provided on the side of the suspension system 30 facing the wearer. Fixed plate 110 prevents the wearer's clothing from interfering with the operation of the low-friction pulleys 40 and bungee cord 20. In addition, the entire suspension system 30 may optionally be encased in a cloth mesh or plastic cover 120 on the top, bottom, and sides so as to further prevent frictional contact with the low-friction pulleys 40 and bungee cord and to prevent mud, sand, and the like from affecting the operation of the pulleys 40. The cover 120 is stripped away for ease of illustration.

Figure 16:
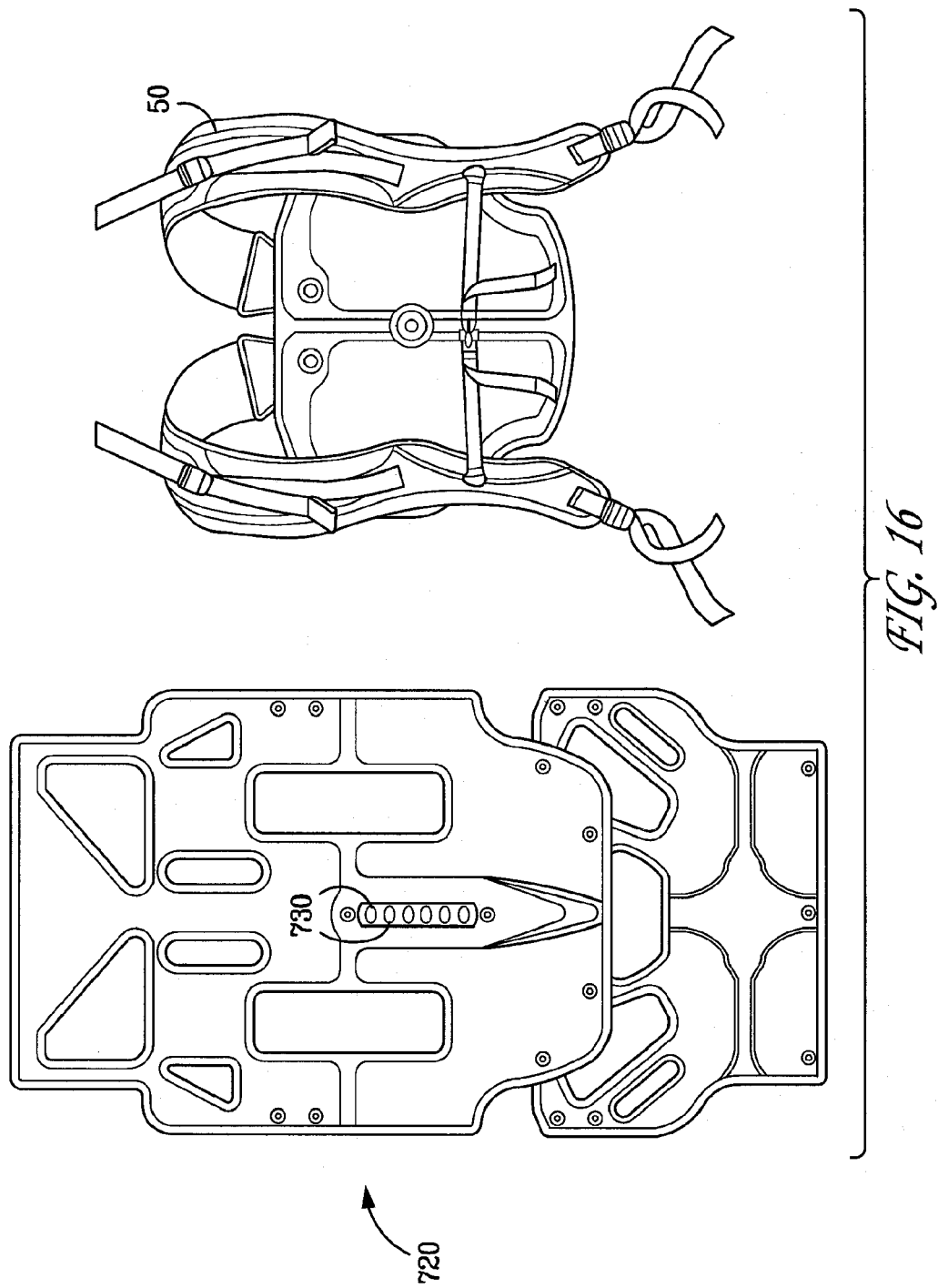
FIG. 16 illustrates the panel portion for connecting the shoulder strap assembly to the suspension system of the backpack of FIG. 15.

For larger and heavy duty day packs, a frame structure 130 is optionally provided to support the suspension system 30 and to connect the suspension system 30 to the shoulder straps 50. The frame structure 130 may contain pads 150 at points of contact with the wearer. Also, as shown in FIG. 5, the pads 150 may provide connection points for the shoulder straps 50 and waist strap 160. However, for lighter duty day packs for students, the suspension system 30 may connect directly to the shoulder straps 50 and/or a panel integral with the shoulder straps 50 as illustrated in FIG. 16, for example. Ideally, for the student day pack embodiment, the only portion of the backpack illustrated in FIGS. 3-6 that is stiff is the suspension system 30 which, in an exemplary embodiment, is sized to squeeze down to less than 3 inches in thickness so it can easily fit into lockers at school, for instance. In such an embodiment, frame structure 130 would need to be bendable or removed altogether.

As noted above, the embodiment of FIG. 7 is based on a backpack having an external frame 220. The suspension system 30 of the embodiment of FIG. 7 is similar to that of the embodiment of FIG. 3 except that the moving frame portion 200 and fixed frame portion 240 of the suspension system 30 are designed to be very light weight. Exemplary arrangements of the suspension system 30 are described below with respect to FIGS. 9-13.

As illustrated in FIG. 7 for an embodiment of a suspension system 30 using bungee cord 20, a cleat 230 is used to clamp the bungee cord. The cleat 230 makes it possible to adjust the spring constant for different weights and stiffnesses by adjusting the length of the bungee cord 20 and cleating it in place. To provide adjustable clamping of the bungee cord 20 for embodiments using it, there are at least 3 mechanisms. For small cords, a jam cleat (ideally with a fair lead) works moderately well for small diameter bungees. Those skilled in the art recognize that a bungee cord has different properties than a rope, making cleats less effective for bungee cords than for rope (the elasticity of compressed rubber makes it pop out of some devices), particularly for large sizes. Thus, for large size bungee cords, a toothed cam device (used both in sailing and rock climbing and derived from ascender and self-belay devices used in rock-climbing) or a winch type device are most effective.

It should further be recognized that setting the spring stiffness is in theory separable from the length of the bungee cord 20. For instance one could translate the spring up and down which would affect the equilibrium point but would not alter the spring stiffness. For example, the spring constant of the bungee cord 20 may be changed by connecting the bungee cord 20 to the top and the bottom portions of the fixed frame portion of the suspension system 30 so that the portions of the bungee cord 20 on either side of the load will pull against each other.

An automatic method of adjustment of the stiffness of the suspension system 30 may be preferable, particularly for children who may not have the dexterity to adjust one of these devices for different conditions.

Running Backpack Embodiment

The principles illustrated above can be applied to any type of load carrying device in use for profession or sports. For example, it has become common for runners or long distance trekkers to run with backpacks carrying water, food, and potentially clothing. Running backpacks are generally made to attaching tightly to the body, hence the load must be accelerated on every step. However, if the load were suspended in accordance with the invention so that it stayed at nearly a constant vertical height and would not have to be accelerated on every step, then a significant reduction in forces would be achieved. To reduce such forces, the backpack of the embodiments of FIGS. 3-6 or 7 may be used with the addition of a frictional device to take out a bit more energy than is dissipated in the compliant coupling. For example, the embodiment of FIG. 8 shows the addition of a rack 300 and pinion 310 that drive a fan 320. Alternatively, as described in U.S. Pat. No. 6,982,497, and in the next embodiment, a generator may be used to generate electricity. As noted above, cleats 230 allow the runner to adjust the compliance of the bungee cord 20 based on the running speed of the runner, for example. A locking mechanism 210 also permits the wearer to prevent the oscillation of the load by locking down the suspension system 30, as when the wearer is at rest. A completely mechanical system would also work. For example, as illustrated in FIG. 8, the mechanical force from the moving load could be transferred to fan 320 which could cool the runner as he or she runs.

Ergonomic/Electrical Generation Backpack Embodiment

As noted above, it is desirable to remove a small amount of energy during running to control the movement of the load. As described above, this can be done be done by using a rack 300 and pinion 310 or a capstan arrangement to turn a generator. Ideally, the amount of energy removed from the system can be adjusted to optimize either ergonomics or electricity-generation based on the use. For example, a more effective system for electricity generation can be achieved by adding a coupling at the bottom as well as on the top of the frame of the suspension system 30. As noted above, by stretching both the top and bottom coupling against each other (while keeping the load in the center of the travel), one can adjust the spring constant to maximize the power output while walking or running at a given frequency. Hence, the backpack can be converted from an optimized ergonomic backpack into a near optimal electricity-generating backpack in the field by simply employing the bottom coupling and turning on the generator to remove electricity. In the case where a more ergonomic backpack is desired, only a coupling at the top is typically used.

Athletic Training Device

There is a large array of athletic training devices on the market that increase the forces that muscle must generate while performing different activities. This training regimen is more successful if the force can be increased during normal movements such as walking or running. However, a problem with simply carrying added weights in a pack of some type is that the added weight results in high accelerative forces which can result in joint damage. Suspending the load in a backpack of the type illustrated in the embodiment of FIGS. 3-8 effectively increases forces equal to the added weight, but keeps control over the peak forces so that the likelihood of injury is significantly reduced. In this sense, the suspended-load backpack of the invention may simulate a hypergravity, where forces are increased but the mass is not. For instance, on a planet demonstrating hypergravity, although one may weigh 50% more, one does not need to decelerate a 50% higher downward kinetic energy (½ mv2) when hitting the ground. (e.g., during running). Instead, there is just a proportional increase in force. On the other hand, it one carried a weight equivalent to 50% of his or her body weight in a conventional backpack, 50% more kinetic energy would have to be dissipated and this would lead to very high peak forces. Alternatively, carrying a 50% load with the suspended load backpack, when one hits the ground during running, the kinetic energy of the load need not be dissipated at the same time; instead, the load can simply move down inside the frame and the kinetic energy can be stored in the compliant coupling over a longer time.

Variations on the Suspension System Design

FIGS. 9-13 illustrate variations on the design of the suspension system 30, particularly the compliant coupling mechanism.

Figure 3:
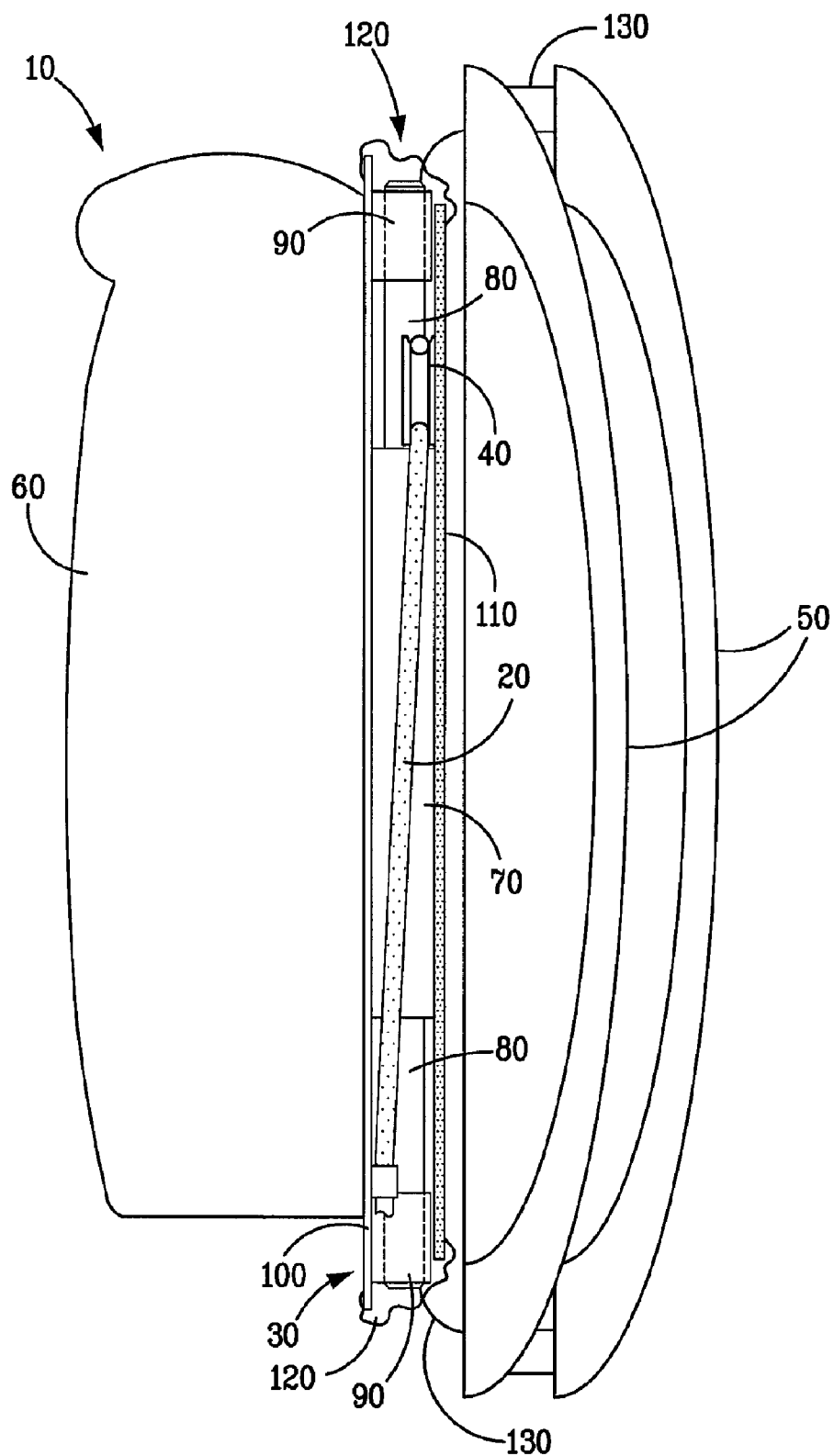
FIG. 3 illustrates an exemplary embodiment of a suspended-load day pack in accordance with the invention.
Figure 9:
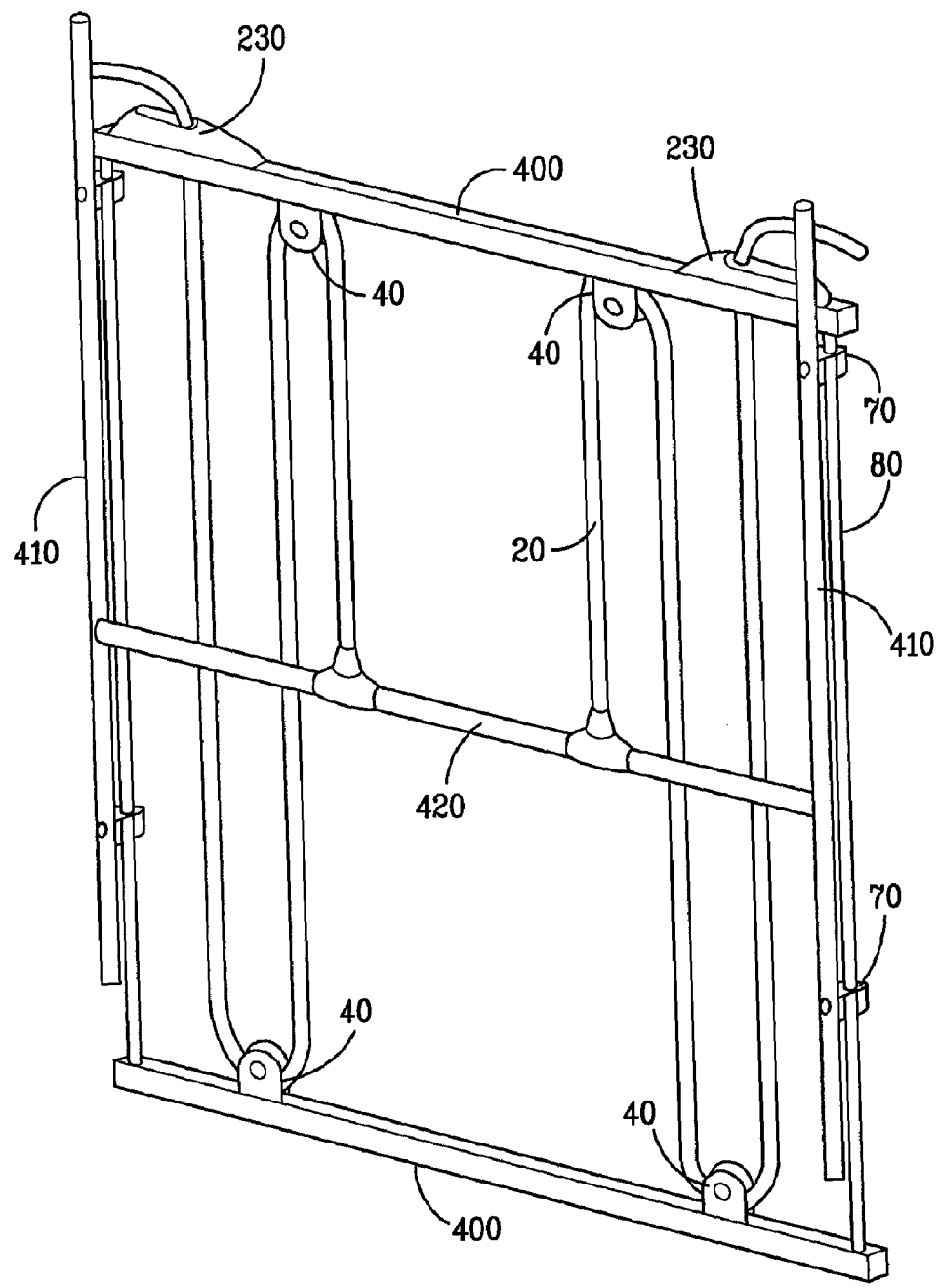
FIGS. 9-13 illustrate alternative embodiments of the frame assembly of the suspension system of the invention.

For example, in the embodiment of FIG. 9, the fixed plate 110 of the embodiment of FIG. 3 is reduced to top and bottom bars 400 that form a frame with vertical rods 80. Similarly, the moving plate 100 is reduced to an H-shaped section including vertical rods 410 connected to bushings 70 and a horizontal bar 420 that connects the vertical rods 410 and is connected to the bungee cord 20 or other compliant mechanism as illustrated.

It has been demonstrated above that a bungee cord 20 strung around pulleys (traversing 2.5 runs of the backpack) provide a useable suspension system 30 for a large volume adult backpack. With a smaller daypack, however, the height of the suspension is only about ½ has much an in a large volume backpack and hence the bungee cord would only be ½ the length. This may negatively impact the effectiveness of the suspension and result in higher forces on the user (i.e. the 5-7 cm displacement would result in larger peak accelerative force). Should this become a problem, one solution would be to provide additional bungee cord lengths by adding more pulleys. An alternate suspension system may provide weight, cost, and reliability advantages. Several alternative suspension systems are shown in FIGS. 10-13.

Figure 10:
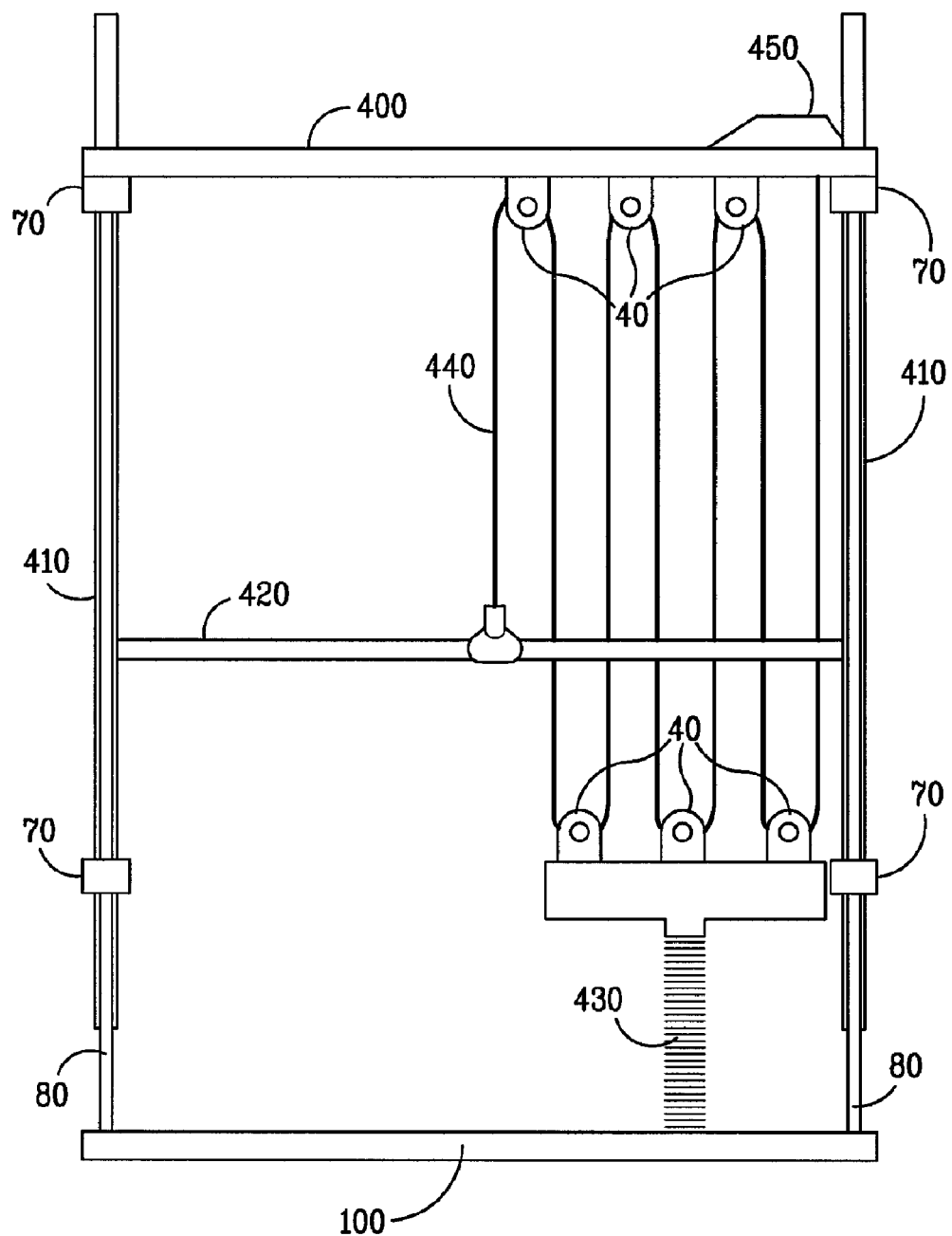

FIG. 10 illustrates an embodiment of the suspension system 30 similar to that illustrated in FIG. 9 except that the compliant mechanism includes a spring 430 that provides a large compliance without having to utilize a very long bungee cord 20, for a large compliance requires a large displacement for a small change in force. FIG. 10 shows the familiar block and tackle. In this embodiment a cord or cable 440 is run through a series of pulleys 40 before connecting to the H-frame crossbar 420. The force is set by the stretch of the spring 430. For each centimeter the spring 430 is stretched, the length of the cord 440 undergoes a length change of, for example, 6 centimeters. Hence, for a given length change of the spring 430 (for which the spring 430 would change force), there is a 6-times greater change of the position of the load. The system thus has a 6-fold higher compliance (⅙ the stiffness) than the compliance of the spring 430 by itself. The stiffness is adjusted by pulling the cord 440 against the spring 430 and cleating it using cleat 450.

Figure 11:
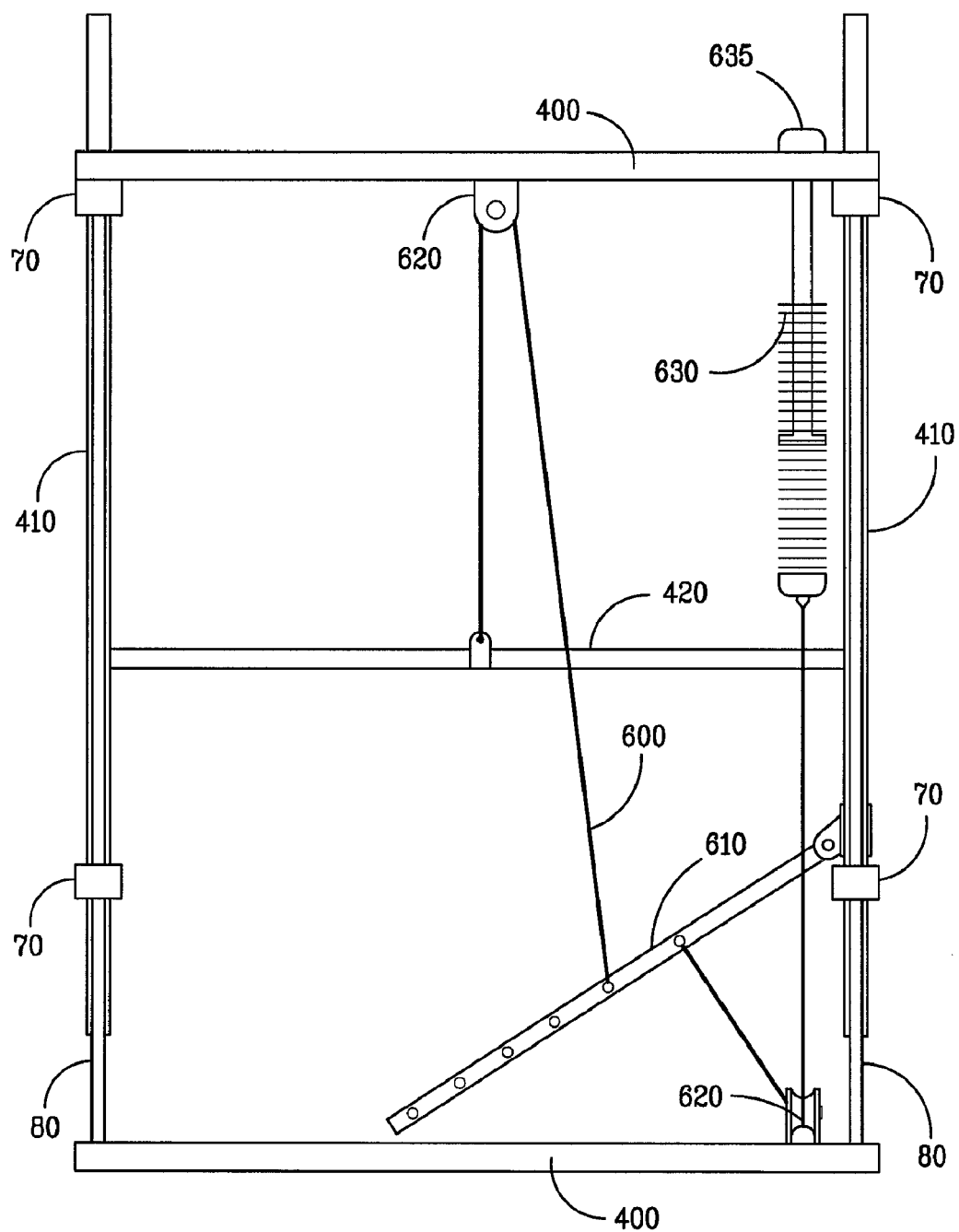
Figure 12:
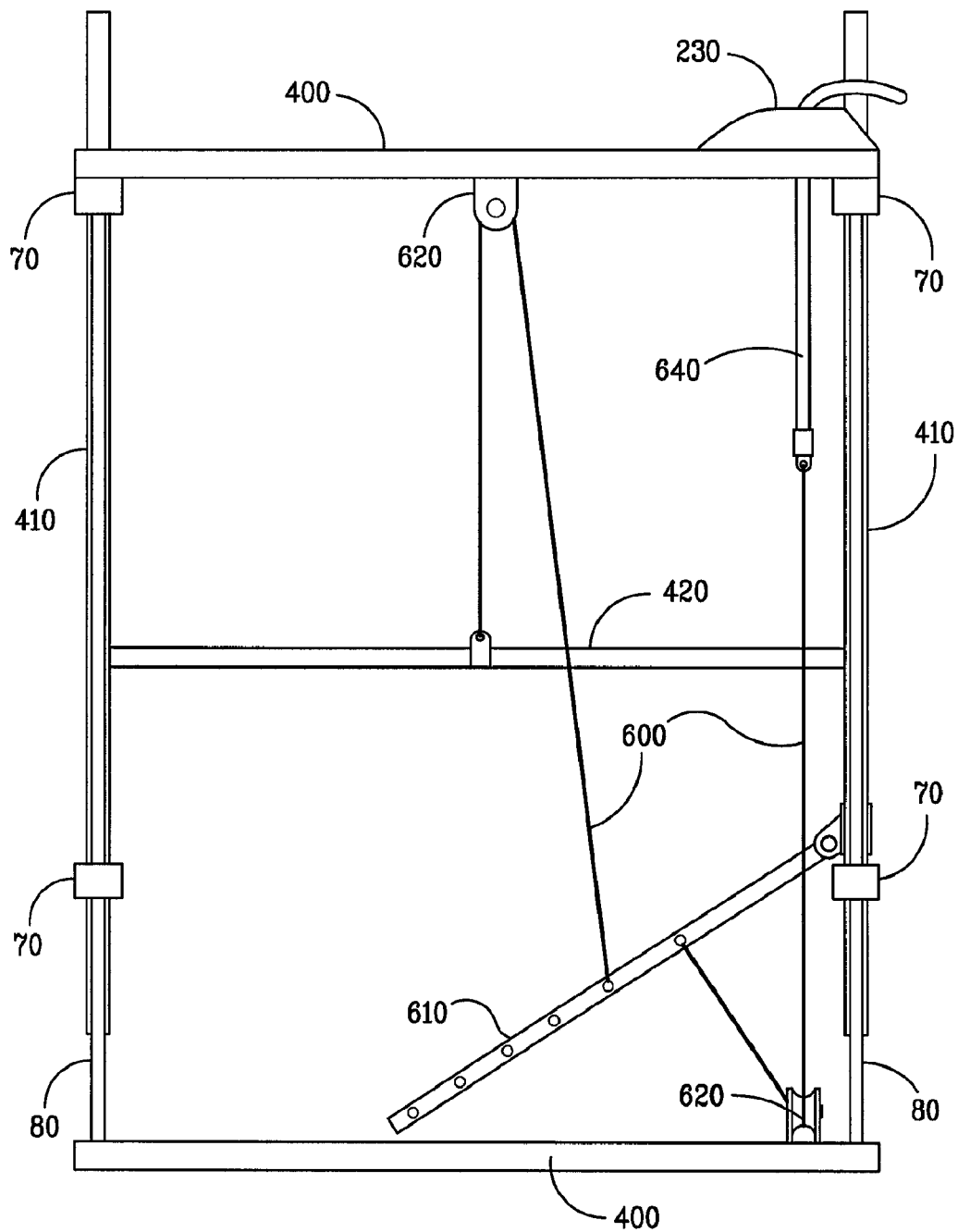

FIGS. 11 and 12 show a device that achieves a similar effect using a lever 610 connected to cords or cables 600 to provide the large length change. In this case, a small stretch in the spring 630 will be accompanied by a much longer vertical displacement of the H-frame, based on the ratio of the distance the attachment points of the cords 600 routed over low-friction pulleys 620 on the lever 610 as compared to the axis of rotation of the lever. In FIG. 11, the spring force is adjusted by using a rotating threaded piece 635 which threads itself down the spring 630, thereby adjusting how many coils are active. In FIG. 12, the spring 630 is replaced by a portion of bungee cord 640, whose length is adjusted by cleating it at different lengths using cleat 230.

Figure 13:
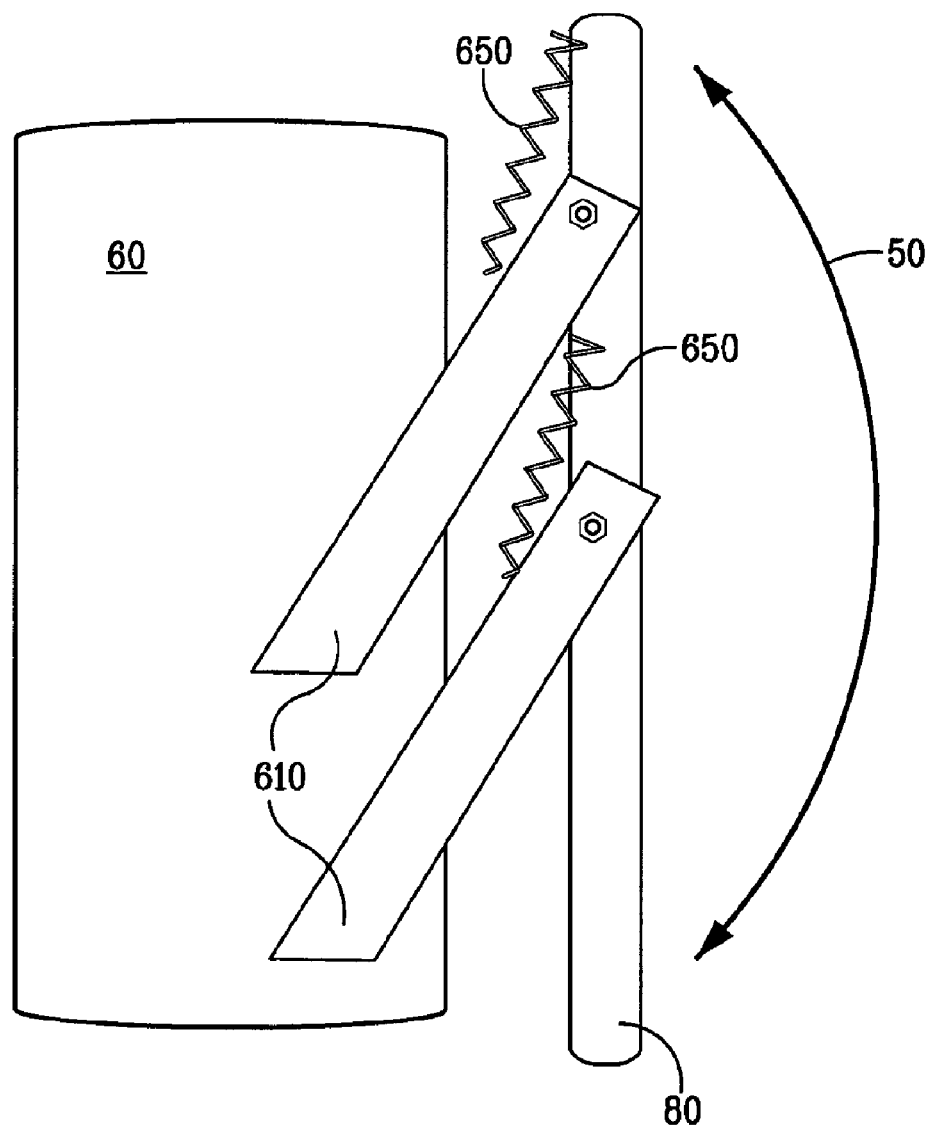

FIG. 13 illustrates an embodiment of the suspension system 30 where the load 60 is connected to the vertical rods 80 via levers 610 on each side thereof, much like jalousie windows. The levers are connected to the vertical rods 80 using springs 650 that have lengths and stiffnesses designed to provide the requisite degree of vertical displacement of the load 60 based on vertical displacement of the vertical rods 80 as a result of walking or running motion by the wearer.

By arranging the spring and lower pulley in the embodiments of FIGS. 11-12 so that the spring 630 is just relaxed if the end of the cord (the end to be attached to the lever 610) is at the pulley mechanism, a nearly constant force may be applied to the upper cord, independent of the angle of the lever 610. This is a new use for the "a-static" mechanism used in the Benioff and Press long-period seismometer of 1958. If the spring 630 is linear, the lower pulley is exactly below the lever pullout, and the upper cord is always vertical whereby the force on the upper cord is exactly constant for all angles of the lever 610.

Bungee Cord Sizing/Compliance Considerations

As noted above, the key to minimizing accelerative forces in accordance with the invention is for the load to stay at the same vertical height with respect to the ground as the backpack frame, which is connected to the hip, undergoes a 5 cm fluctuation in height off the ground. To work perfectly, then as the frame moves up 5 cm with the hip, the load would move downwards within the frame the same distance, thereby keeping the load at the same height. This would also result in stretching the bungee cords by 5 cm. To limit the peak accelerative force to about 10% over the static force, bungee cords are chosen such that the 5 cm stretch represents only about 10% of the distance the bungee cord was stretched against the static load. Accordingly, bungee cords are chosen since they may be stretched approximately 50 cm or more beyond their resting length when the load was attached while still operating in the linear portion of the stress-strain curve. Thus, by Hooke's law, an additional stretch of 5 cm (during walking) would not increase force by more than 10% of the load.

Figures 14A, 14B, 14C:
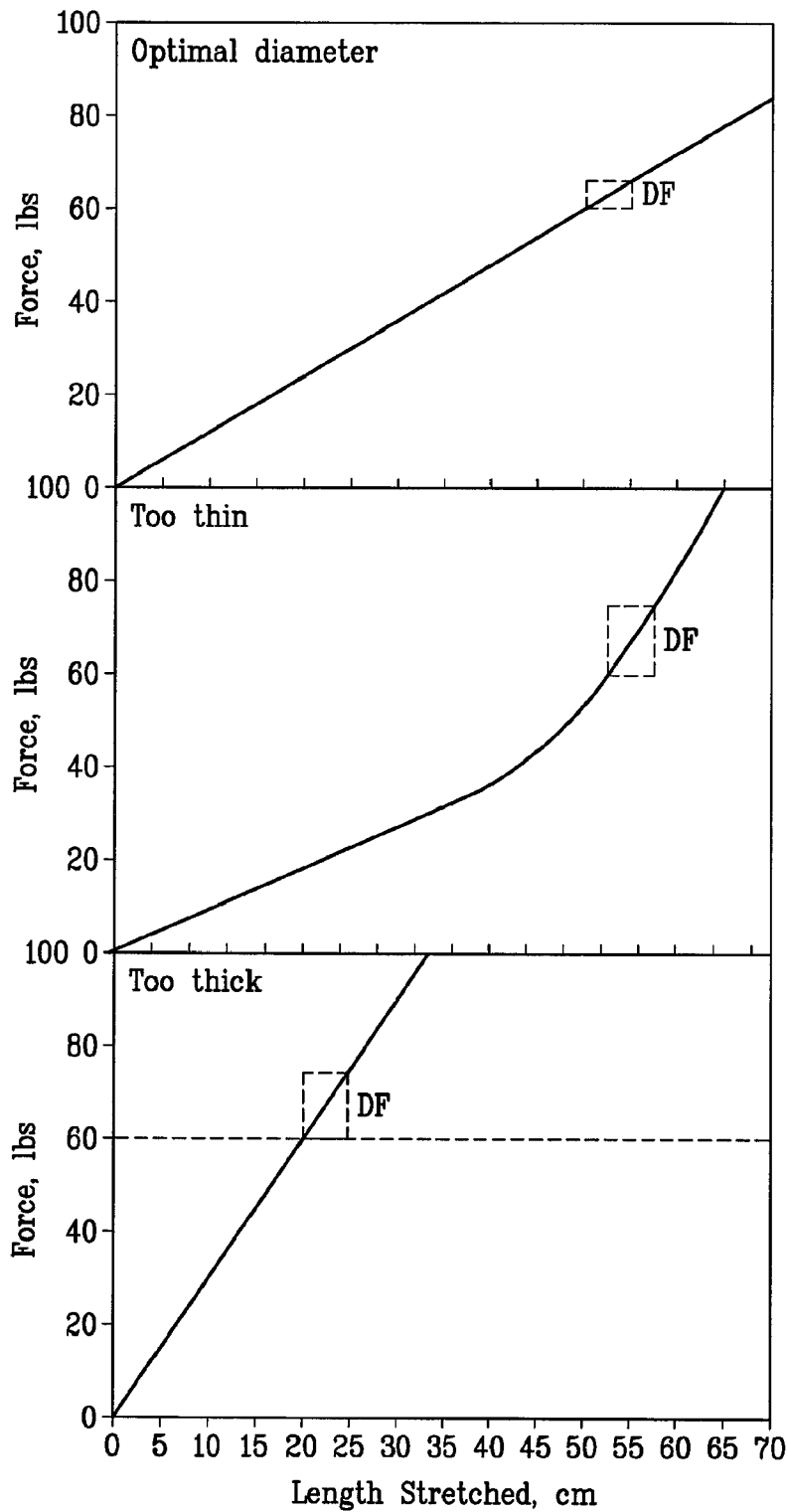
FIG. 14 illustrates how the optimal diameter of the bungee cord is determined for use as the compliant mechanism.

FIG. 14 is a theoretical graph of the force versus stretch length illustrating this point. Under these conditions an extension or shortening of the cord by 5 cm will result in about a 10% change in force. To achieve this condition there are several considerations. First, the bungee cord must stretch by at least 50 cm to support the load, and hence the bungee cord must be quite long. In the embodiment of FIG. 7, for example, the overall stretched length of the bungee cord 20 is about 1.8 m. Of course, this cannot fit within the 67 cm backpack frame height in a single pass. To accommodate the long coupling, the ½ inch diameter bungee cord was run over two low friction pulleys, traversing the frame 2½ times. Hence, as noted above, the length of the cord is one consideration.

Another consideration is the diameter of the bungee cord 20. If the bungee cord is the correct width, the force-diameter curve is linear, as shown in FIG. 14 (top panel). However, if the bungee cord 20 is too thin, then the strain becomes too high and reaches the non-linear portion curve of the rubber or other material as shown in FIG. 14 (middle panel). Hence a 5 cm change in length stretched would result in a larger alteration in force. (Note that the material covering the bungee cord affects its stress-strain relationship as well.) If by contrast, the bungee cord 20 is too thick, then for a given length of bungee cord the length stretched would be too short as shown in FIG. 14 (bottom panel). Hence, a 5 cm stretch would represent more than a 10% change in the length stretched against a static load, and hence would result in larger changes in force. Note that in theory one could use such a thick cord but it would have to be very long. This would result in heavy weights of the cord as well as the pulleys (the cord would have to make many more traverses to accommodate the long length).

The above analysis is based on the assumption that the suspension system 30 is quasi-static (i.e., that resonance is avoided). The fact that the acceleration of the load is kept low (because of the small accelerative force) helps prevent resonance. More precisely, it is important that the natural frequency of the system is kept well below (less than one-third of) the stepping frequency. If this condition is not met, then resonance might result and it would be necessary to remove mechanical energy from the system (as happens with the electricity-generating backpack as the generator is turned). However, whenever mechanical energy is removed from the system, it must ultimately be replaced by mechanical work of the muscle. Performance of muscle work, in turn, requires extra metabolic energy to be expended, thereby reducing (or even nullifying) a major benefit of the ergonomic backpack: the reduction of metabolic cost and fatigue carrying a given load.

Finally, for the system to work optimally, the compliance of the suspension system should be adjustable. A characteristic of a compliant suspension is that a small change in force causes a large change in position. If one adds or removes a pound or two to the load storage bag, the suspension will either bottom out or top out. Hence, it is desirable to be able to readjust the compliance based on the weight of the load. As noted above, bungee cords may be stretched and cleated and offer a very simple way to achieve this adjustability.

Backpack Assembly

Figure 15:
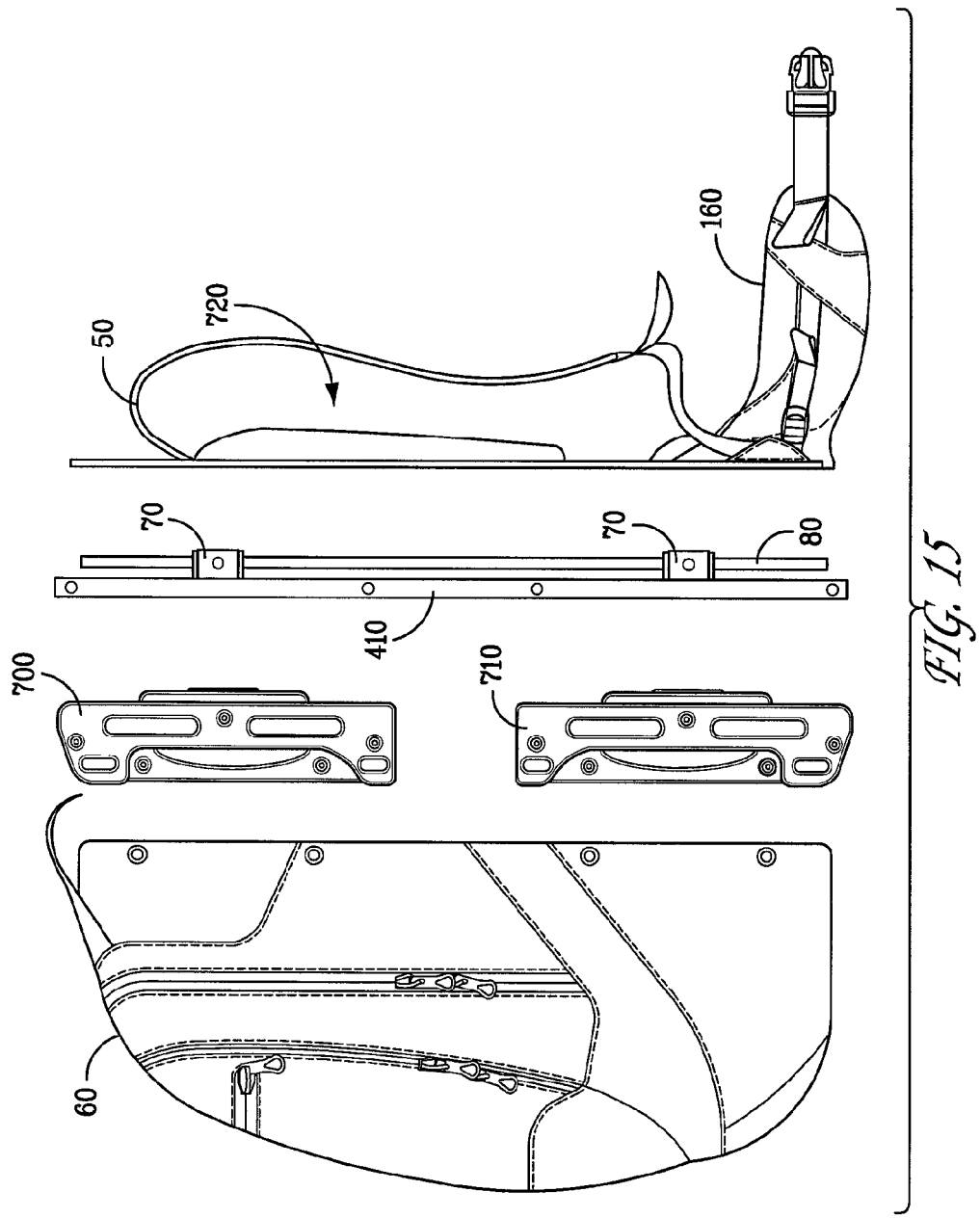
FIG. 15 illustrates a backpack in exploded view that is adapted to connect to H-framed moving portions of the backpack suspension system.
Figure 17:
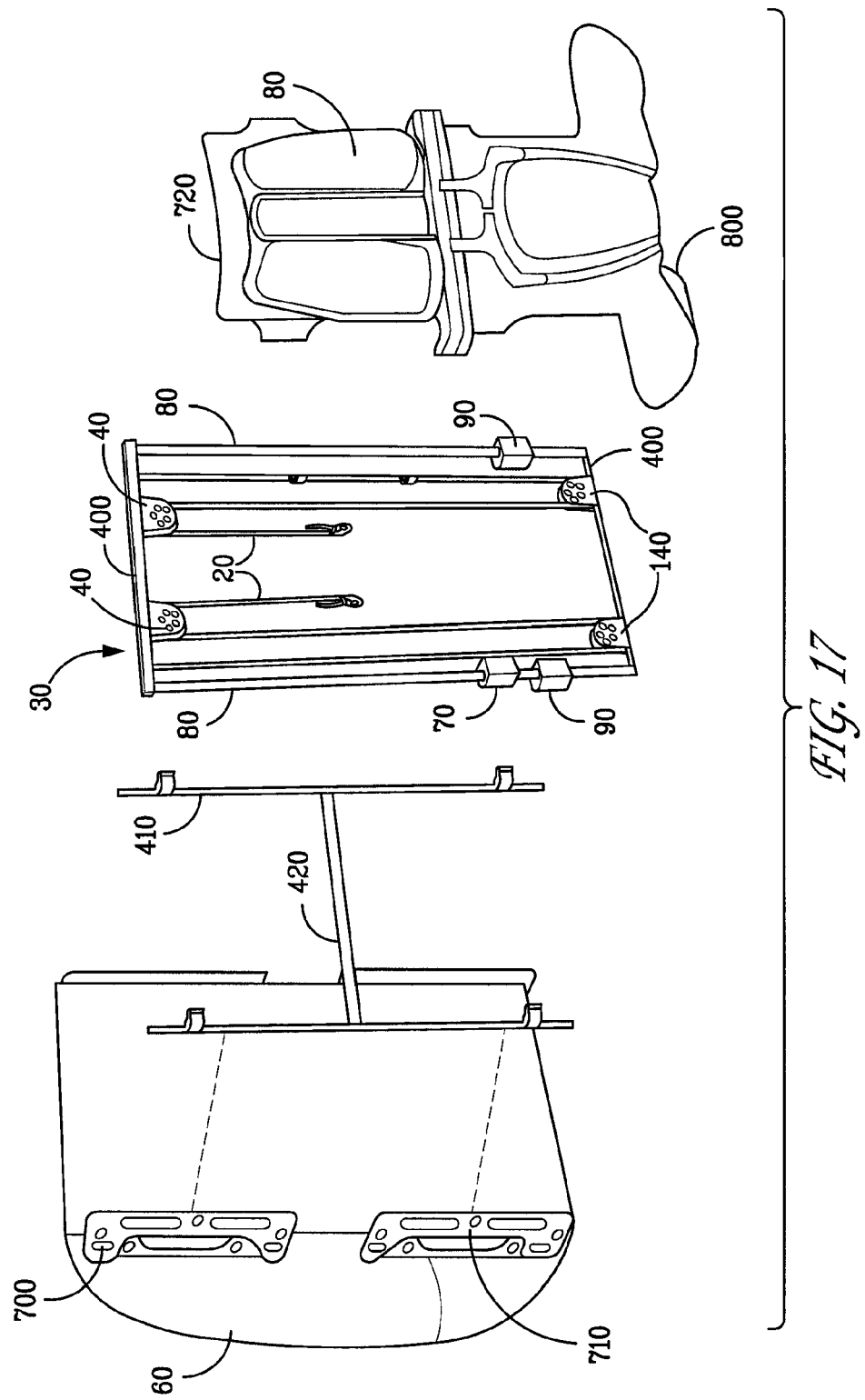
FIG. 17 illustrates an exploded view of the backpack of FIG. 15 where the connection to the suspension system is more apparent.

FIG. 15 illustrates an alternative technique for connecting the pack body 60 to the H-shaped frame in the embodiments of FIGS. 9-13. As illustrated, the pack body 60 is connected on respective sides thereof to the vertical rods 410 using molded plastic integrators 700 and 710 that are snapped onto corresponding bearing attachments of the vertical rods 410. The molded plastic panel interface assembly 720 (FIG. 16) may then be connected to the fixed portion of the frame including vertical rods 80 and crossbars 400, provided the interface assembly 720 does not interfere with the movement of the bushings 70 on the vertical rods 80. The shoulder strap assembly 50 (FIG. 16) is then connected to the interface assembly 720. FIG. 17 illustrates an exploded view of the backpack of FIG. 15 where the connections of the interface assembly 720 to the suspension system 30 are more apparent. As illustrated, the load storage bag 60 is connected to the molded plastic integrators 700 and 710 for attaching the load storage bag (pack body) 60 to the vertical rods 410 of the H-frame. In turn, the H-frame attaches to bearings 70 on the vertical rods 80 of the fixed frame between the pack body 60 and the suspension system 30. The interface assembly 720 bolts to bearing rods of vertical rods 80 and the bearing rods are placed so as to allow a full range of motion of the bearing housings of the bushings 70. A flange 800 at the lower end of the interface assembly bolts to the lower bar 400 of the fixed frame. Finally, compression molded foam and air mesh suspension panel 810 including shoulder straps 50 and optionally waist straps 160 is mounted to the interface assembly 720 via vertical holes 730 in the interface assembly 720 by screwing the shoulder straps 50 into one of the holes 730 in accordance with the trunk length of the wearer.

Golf Bag Embodiment

Figure 18:
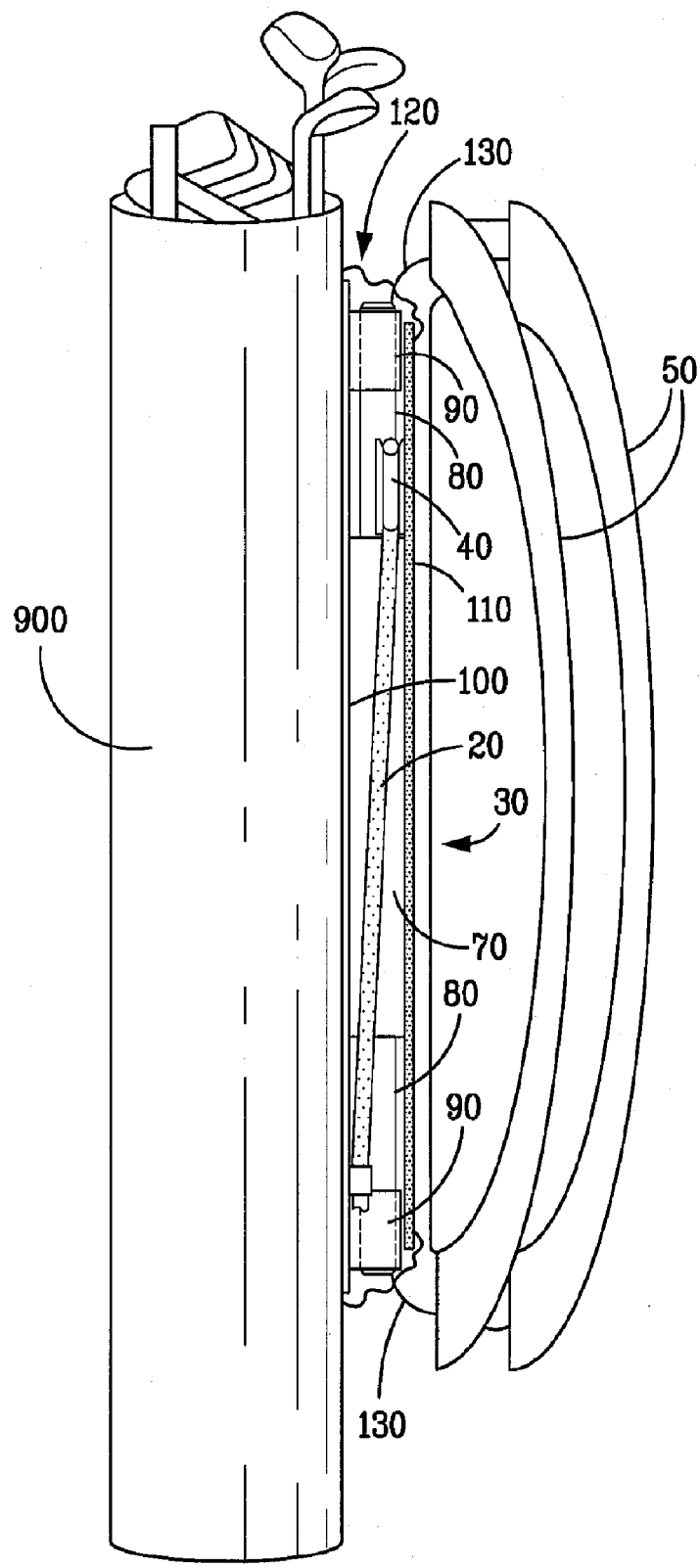
FIG. 18 illustrates an embodiment of a backpack for carrying golf clubs and having reduced forces on the shoulders of the golfer.

A very useful application of load suspension is for a golf bag. Modern golf bags are often worn in a backpack configuration-with two straps going over the shoulders. By interposing the suspension system of the invention in between the straps and the club container 900 as illustrated in FIG. 18, one obtains a suspended-load golf bag. Golfers can wear the backpack of FIG. 18 as they moving along the golf course and the suspension system 30 will reduce the peak accelerative forces felt by the wearer. Those skilled in the art will also appreciate that it is further possible to use a stiffer suspension as described above and to generate some electricity to keep cell phones and iPods charged up as the wearer moves along the course.

Those skilled in the art will also appreciate that numerous other modifications to the invention are possible within the scope of the invention. For example, if load shifting during rapid movements become a significant problem, the lock on the suspended load may be designed to engage automatically. In addition, microgenerators may be used to convert the mechanical energy into electrical energy. Also, other suspension mechanisms may also be used. For example, one might use an array of air-filled cylinders or pistons as a sheet of roller bearings between the fixed part of the pack (against the wearer's back) and the suspended load. Those skilled in the art will appreciate that it is desirable for all of the frame elements used in the backpack to be very strong yet light in weight. In the exemplary embodiments herein, the frame elements may comprise aluminum tubing. Those skilled in the art will appreciate that an electroless nickel coating of aluminum permits the using of aluminum tubing for bearing surfaces where ordinary steel would otherwise have to be used. Finally, the suspension system of the invention may be used to facilitate carrying of any of a variety of loads on the back of the wearer. For example, firemen may use the suspension system to carry water, hoses, and/or tools used to fight fires, particularly forest fires. The loads themselves could be any size or shape and the load storage means need not be a bag but may have any suitable size or shape in accordance with the load to be carried. Accordingly, the scope of the invention is not intended to be limited to the preferred embodiment described above, but only by the appended claims.

What is claimed:

1. A suspended load backpack, comprising:
   shoulder straps;
   means for accepting a load to be carried by said backpack on a wearer's back; and
   a suspension system mounted on the wearer's back between the shoulder straps and the load accepting means and that has a first portion connected directly or indirectly to said shoulder straps and a second portion connected to said load accepting means, said suspension system incorporating a compliant mechanism that permits said second portion of said suspension system and said load accepting means to move up, relative to said first portion of said suspension system, when a gait of a wearer of the backpack causes the first portion to move downward relative to the ground and to move down, relative to the first portion of said suspension system, when the gait of the wearer of the backpack causes the first portion of said suspension system to move upward relative to the ground, thereby reducing up and down motion of the load relative to the ground and accelerative forces during the gait of the wearer of the backpack,
   wherein a natural frequency of said compliant mechanism with said load is below a stepping frequency of the wearer of the backpack so as to reduce resonance.

2. A suspended load backpack as in claim 1, wherein said first portion of said suspension system comprises a first plate and said second portion of said suspension system comprises a second plate with means for suspending said load accepting means therefrom.

3. A suspended load backpack as in claim 1, wherein said load accepting means is adapted to hold golf clubs.

4. A suspended load backpack as in claim 1, wherein said compliant mechanism dissipates energy so as to prevent resonance as a result of up/down movement of the second portion of said suspension system relative to the first portion of said suspension system.

5. A suspended load backpack as in claim 1, wherein said compliant mechanism is connected to a top and a bottom portion of the first portion of said suspension system to increase its spring constant.

6. A suspended load backpack as in claim 1, further comprising an interface assembly that connects said first portion of said suspension system to said shoulder straps and/or a hip belt so as to permit adjustment of the shoulder straps and/or hip belt to the suspension system based on trunk length of the wearer.

7. A suspended load backpack as in claim 1, wherein the natural frequency of said compliant mechanism is 1 Hz or below.

8. A suspended load backpack as in claim 1, wherein said compliant mechanism comprises a bungee cord connected on one end to said first portion of said suspension system and on another end to said second portion of said suspension system, said bungee cord being routed over at least one low-friction pulley.

9. A suspended load backpack as in claim 8, wherein said compliant mechanism stretches 5-7 cm during a step of the wearer, and said 5-7 cm represents about 10%-15% of the distance of said compliant mechanism stretched at equilibrium against the load.

10. A suspended load backpack as in claim 1, wherein the first portion of said suspension system comprises at least two vertical rods, further comprising bushings on each of said vertical rods, said bushings being connected to said second portion of said suspension system so as to enable said second portion of said suspension system to move up and down on said vertical rods with down and up movement of said load accepting means and said second portion of said suspension system.

11. A suspended load backpack as in claim 10, further comprising at least one locking device connected to at least one of said vertical rods and adapted to prevent said second portion of said suspension system from moving with respect to the first portion of said suspension system when said locking device is tightened.

12. A suspended load backpack as in claim 1, further comprising adjustment means for adjusting the stiffness of said compliant mechanism.

13. A suspended load backpack as in claim 12, wherein said compliant mechanism includes a bungee cord and said adjustment means adjusts a length of said bungee cord extending between said first and second portions of said suspension system.

14. A suspended load backpack as in claim 1, further comprising a rack connected to one of said first portion or said second portion of said suspension system and a pinion gear connected to the other portion said suspension system whereby said rack and pinion gear move relative to each other as the first and second portions of the suspension system move relative to each other.

15. A suspended load backpack as in claim 14, wherein said rack is adapted to cause said pinion gear to turn as said rack moves up and down.

16. A suspended load backpack as in claim 15, further comprising a fan connected to said pinion gear so as to turn in response to up and down movement imparted to said pinion gear with respect to said rack.

17. A suspended load backpack as in claim 1, wherein the first portion of said suspension system comprises at least two vertical rods connected to each other by at least one horizontal bar, and wherein the second portion of said suspension system comprises bushings that move up and down on said vertical rods and an H-frame comprising vertical rods connected to said bushings and a horizontal bar connecting said vertical rods of said H-frame.

18. A suspended load backpack as in claim 17, wherein respective ends of said compliant mechanism are connected to said at least one horizontal bar of the first portion of said suspension system and the horizontal bar of said H-frame.

19. A suspended load backpack as in claim 17, wherein said compliant mechanism comprises a spring and/or a bungee cord connected to a lever whereby vertical movement of said H-frame causes said lever to pull against said spring and/or bungee cord.

20. A suspended load backpack as in claim 17, wherein the first and second portions of said suspension system are made of aluminum tubing.

21. A suspended load backpack as in claim 17, wherein said load accepting means is connected to the vertical bars of said H-frame.

22. A suspended load backpack as in claim 17, wherein said compliant mechanism comprises a bungee cord and at least one low-friction pulley.

23. A suspended load backpack as in claim 22, wherein said compliant mechanism further comprises a block and tackle including said at least one low-friction pulley and a spring between said block and tackle and said at least one horizontal bar of the first portion of said suspension system.

* * * * *